(12) United States Patent
Arney et al.

(10) Patent No.: US 6,416,838 B1
(45) Date of Patent: Jul. 9, 2002

(54) COMPOSITIONS AND ARTICLES MADE THEREFROM

(75) Inventors: David S. Arney, St. Paul, MN (US); Richard E. Bennett, Hudson, WI (US); Babu N. Gaddam, Woodbury, MN (US); Steven M. Heilmann; Brant U. Kolb, both of Afton, MN (US); Larry R. Krepski, White Bear Lake, MN (US); David B. Olson, Marine on St. Croix, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/582,605

(22) PCT Filed: Oct. 28, 1999

(86) PCT No.: PCT/US99/25276
§ 371 (c)(1),
(2), (4) Date: Jun. 28, 2000

(87) PCT Pub. No.: WO01/30872
PCT Pub. Date: May 3, 2001

(51) Int. Cl.$^7$ .................... B32B 3/02; B32B 27/36; C08F 218/02; C08F 118/02; C07C 229/00
(52) U.S. Cl. .................... 428/64.7; 428/412; 428/65.2; 526/307.7; 526/319; 560/41
(58) Field of Search ............................... 526/307.7, 319, 526/313, 326; 428/412, 64.4–65.9; 560/41, 38, 37, 19

(56) References Cited

U.S. PATENT DOCUMENTS

| | | |
|---|---|---|
| 4,181,752 A | 1/1980 | Martens et al. |
| 4,379,201 A | 4/1983 | Heilmann et al. |
| 4,503,531 A | 3/1985 | Kato |
| 4,683,169 A | 7/1987 | Curry et al. |
| 4,737,559 A | 4/1988 | Kellen et al. |
| 4,760,012 A | 7/1988 | Mochizuki et al. |
| 4,800,112 A | 1/1989 | Kano et al. |
| 5,037,579 A | 8/1991 | Matchett |
| 5,059,462 A | 10/1991 | Kurisu et al. |
| 5,146,438 A | 9/1992 | Harper |
| 5,151,310 A | 9/1992 | Yanagisawa et al. |
| 5,167,996 A | 12/1992 | Kurisu et al. |
| 5,188,875 A | 2/1993 | Yamaoka et al. |
| 5,213,947 A | 5/1993 | Ueda et al. |
| 5,244,775 A | 9/1993 | Miwa et al. |
| 5,506,279 A | 4/1996 | Babu et al. |
| 5,602,221 A * | 2/1997 | Bennett et al. .......... 526/307.7 |
| 5,708,110 A | 1/1998 | Bennett et al. |

FOREIGN PATENT DOCUMENTS

| | | |
|---|---|---|
| EP | 0 330 197 | 8/1989 |
| EP | 0 989 174 A1 | 3/2000 |
| WO | WO 96/16134 | 5/1996 |
| WO | WO 98/08220 | 2/1998 |
| WO | WO 98/50340 | 11/1998 |
| WO | WO 00/06495 | 2/2000 |

OTHER PUBLICATIONS

Bortnowska–Barela B.: "Synthesis of Copolymers of Tert–Butyl Methacrylate and Halogenated Phenyl Methacrylates for the Production of Optical Adhesives with a High Refractive Index." Rapra Abstracts, vol. 31, No. 3, Mar. 1994, p. 118 XP000430833 Abstract RI 49286.

* cited by examiner

Primary Examiner—Robert Dawson
Assistant Examiner—Michael J Feely
(74) Attorney, Agent, or Firm—Daniel R. Pastirik

(57) ABSTRACT

The present invention relates to a composition comprising a first monomer having the formula $CH_2=CHCOOR^1$, where $R^1$ is a linear alkyl group having from 9 to 16 carbon atoms or a branched alkyl group having from 9 to 30 carbon atoms, and whose homopolymer has a Tg less than 0° C.; and/or a second monomer having the formula $CH_2=CHCOOR^2$, where $R^2$ is an alkyl group having at least 9 carbon atoms whose homopolymer has a Tg greater than 15° C.; and a third component which may be another monomer, a polymer, surface-modified particles, or combinations thereof as well as article comprising the composition.

55 Claims, No Drawings

COMPOSITIONS AND ARTICLES MADE THEREFROM

FIELD OF THE INVENTION

The present invention relates to compositions and article made from these compositions. In preferred embodiments, the compositions do not craze polycarbonate.

BACKGROUND OF THE INVENTION

Crazing is the formation of micro cracks in on a substrate or dissolution of a portion of the substrate resulting in loss of optical clarity. Polycarbonate substrates craze under a variety of conditions including when exposed to chemicals that attack the polycarbonate substrate. Crazed polycarbonate tends to deflect and scatter light.

Polycarbonate is often used as a substrate for optical recording media such as digital versatile discs (DVDs) and digital video recordable discs (DVRs). Available DVDs often include two polycarbonate discs bonded together through an adhesive composition. One or both of the polycarbonate discs may contain data. The disc if often coated with a metal to enable the data to be read by an optical reader. Optical readers use a beam of light to read the data. In some applications, the beam of light must pass through a number of layers including, for example, a polycarbonate disc, an adhesive layer, and combinations thereof, prior to reaching the data. The nature of the layers, and in particular the refractive index of the layers, through which the beam must pass can impact the ability of the optical reader to read the data. Since optical recording medium are used for both immediate and archival purposes, it is necessary to be able to read data from an optical recording medium years after it has been stored on the DVD.

Selecting a suitable adhesive composition for use on polycarbonate substrates in general and for optical recording medium, for example, DVDs, in particular, is difficult. Adhesive compositions and components of adhesive compositions can attack polycarbonate substrates, which can cause crazing. Crazing alters the optical properties of the polycarbonate substrate and can render optical recording media unreadable, which can interfere with the short term and long term utility of an optical recording medium.

SUMMARY OF THE INVENTION

In a first aspect, the invention features compositions including polymerizable compositions and cured compositions including, for example, adhesives, that do not cause crazing in polycarbonate under certain circumstances. In one embodiment, the composition includes: a) a first monomer having the formula $CH_2=CHCOOR^1$, where $R^1$ is a linear alkyl group having from 9 to 16 carbon atoms or a branched alkyl group having from 9 to 30 carbon atoms, and whose homopolymer has a Tg less than 0° C.; b) a second monomer having the formula $CH_2=CHCOOR^2$, where $R^2$ is an alkyl group having at least 9 carbon atoms whose homopolymer has a $T_g$ greater than 15° C.; and c) a component comprising any of: a third monomer having the formula $CH_2=CHCONR^3R^4$, where $R^3$ is hydrogen or an alkyl group having from 1 to 10 carbon atoms and $R^4$ is an alkyl group, when $R^3$ is hydrogen, $R^4$ is an alkyl group having from 8 to 16 carbon atoms, and when $R^3$ is an alkyl group having from 1 to 10 carbon atoms, $R^4$ is an alkyl group having a sufficient number of carbon atoms such that the sum of the carbon atoms of $R^3$ and $R^4$ is at least 8, the homopolymer of the third monomer having a $T_g$ greater than 15° C.; i) a monomer having the formula $CH_2CHCONHCR^5R^6COWP$, where $R^5$ and $R^6$ are alkyl groups having from 1 to 14 carbon atoms, cycloalkyl groups having from 3 to 14 carbon atoms, aryl groups having from 5 to 12 carbon atoms, an arene group having from 6 to 16 carbon atoms and no greater than 3 atoms selected from the group consisting of S, N, and non-peroxide O, or where $R^5$ and $R^6$ when taken together with the carbon atoms to which they are connected form a carboxylic ring having 4 to 12 carbon atoms, W is O, S, NH, or a divalent connecting group, and P is $ArR^7$, where Ar is an arylene group and $R^7$ is a linear or branched alkyl or alkoxy group, an aryl group, or an alkarylene group such that the total number of carbon atoms in $ArR^7$ is at least 10, or

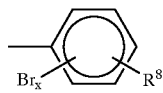

where x is from 1 to 4, and $R^8$ is linear or branched alkyl group having at least 4 carbon atoms; ii) a monomer having the formula

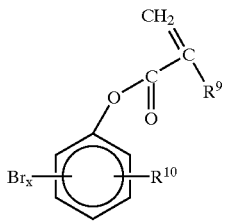

where $R^9$ is H or $CH_3$, x is from 1 to 4, and $R^{10}$ is a linear or branched alkyl group having at least 4 carbon atoms; iii) a monomer having the formula $CH_2=CHCOO(R^{11})_nOCOCH=CH_2$, where $R^{11}$ is a linear or branched alkylene and n is at least 6; iv) a polymer having a molecular weight greater than about 1500 and being soluble in at least one of the first monomer and the second monomer; v) surface-modified particles; and vi) combinations thereof, wherein the composition does not cause crazing in polycarbonate when in contact with polycarbonate for a period of about 30 minutes at 25° C.

In a second aspect, the invention features a composition that includes at least one polymerizable component and crystalline zirconia particles having an average primary particle size no greater than about 20 nm and having a dispersion index of from about 1–3, where the particles have a crystallinity index of at least about 0.65 and at least about 70% combined cubic and tetragonal crystal lattice structure in the absence of a cubic tetragonal crystal phase stabilizer. In one embodiment, the composition is coated on a substrate to modify the refractive index of the substrate.

In a third aspect, the invention features a composition that includes the reaction product of a reaction mixture that includes an above-described composition a crosslinking agent, and a photoinitiator. In one embodiment, the composition is an adhesive (for example, a pressure sensitive adhesive).

In a fourth aspect, the invention features an article that includes polycarbonate substrate and an above-described composition on the substrate. In one embodiment, the article further includes a second polycarbonate substrate, and the composition is disposed between the first polycarbonate substrate and the second polycarbonate substrate. In some embodiments, the article is an optical recording medium, for example, a DVD or DVR.

In a fifth aspect, the invention features compounds having the formula $CH_2=CHCONHC(CH_3)_2COOCH_2CH_2—R$, where R is $OC_6H_5$, $S—C_6H_5$, $S—CH_2CH_3$, $O—C_6H_4—C(CH_3)_3$, or $O—C_6H_4—C(CH_3)_2—C_6H_5$.

In a sixth aspect, the invention features adhesive compositions that include the reaction product of a reaction mixture that includes a compound comprising compounds having the formula: $CH_2=CHCONHC(CH_3)_2COOCH_2CH_2—R$, where R is $OC_6H_5$, $S—C_6H_5$, $S—CH_2CH_3$, $O—C_6H_4—C(CH_3)_3$, or $O—C_6H_4—C(CH_3)_2—C_6H_5$.

The compositions of the present invention preferably do not craze polycarbonate substrates under certain circumstances. The compositions of the present invention enhance the archival function and potential for optical discs that include these compositions since these compositions can be formulated to be free of crazing for extended periods. For example, the compositions enable the manufacture of optical recording medium, for example, DVDs and DVRs, that are resistant to crazing.

In addition, a variety of components can be added to the composition to achieve a composition that is does not cause crazing in polycarbonate and to alter properties of the composition including, for example, refractive index, viscosity, cleavage strength to polycarbonate, and combinations thereof.

The inclusive of colloidal particles, for example, can increase the refractive index of the composition. This is particularly useful in optical disc applications, such as DVD, that require digital data to be read through the composition.

The invention provides an adhesive composition that exhibits good bond strength to polycarbonate substrates such that it maintains the bond under conditions of elevated temperature (at about 70° C.). The adhesive composition also provides a bond to polycarbonate of good durability. The bond integrity is also maintained when cooled to room temperature after exposure to elevated temperatures. The adhesive composition also exhibits good adhesion to surfaces such as metal, silicon carbide, silicon nitride, and silicon oxide-coated polycarbonate substrates. The adhesive composition can be used in a variety of articles including, for example, digital versatile discs, for example, digital video discs, memory switches, vibration dampers, copper circuitry, and multi-layer polycarbonate articles, for example, windows, as well as in general bonding applications and in applications where refractive index matching is desired.

Other features of the invention will be apparent from the following description of preferred embodiments thereof, and from the claims.

DETAILED DESCRIPTION

The invention provides polymerizable compositions that include monomers and other components, including polymers and articles, and that preferably do not cause crazing in polycarbonate under certain circumstances, more preferably under any circumstance. These polymerizable compositions also preferably do not cause crazing in polycarbonate when cured. Preferably, the compositions are formulated such that they can be coated on a polycarbonate substrate and cured prior to the presence of crazing in the polycarbonate. Preferably the compositions do not cause crazing in polycarbonate after having been in contact with the polycarbonate for a period of 30 minutes at 25° C., more preferably after having been in contact with the composition for a period of 120 minutes, at 25° C., most preferably about 300 minutes at 25° C., and ambient relative humidity.

The compositions preferably have a viscosity of from about 50 centipoise (cPs) to about 3,000 cPs, more preferably from about 100 cPs to about 1000 cPs, most preferably from about 150 cPs to about 400 cPs.

The compositions can also be formulated to exhibit a predetermined refractive index. When used in optical discs, the compositions preferably exhibit a refractive index useful for optical discs, preferably at least about 1.48, more preferably from about 1.48 to about 1.55. In some applications the composition is formulated to match the refractive index of the substrate. Preferably the composition is formulated to exhibit a refractive index of at least about 1.48, more preferably at least about 1.55.

The compositions can be formulated to be applied to a substrate using a variety of coating methods including, for example, spin coating, web coating, transfer coating, screen printing, electrospraying, and curtain coating.

The compositions can be cured to form a variety of adhesives including, for example, pressure sensitive adhesives and structural adhesives. Preferably the adhesive compositions are formulated to exhibit a cleavage strength to polycarbonate of at least about 50 lbs of force, more preferably at least about 75 lbs of force when tested according to the Cleavage Strength Test Method in the Examples below.

The individual components of the compositions will now be described.

Monomers

The composition can include a first monomer whose homopolymer has a Tg less than 0° C. The first monomer has the formula $CH_2=CHCOOR^1$, where $R^1$ is an alkyl group that includes linear alkyl groups having from 9 to 16 carbon atoms and branched alkyl groups having from 9 to 30 carbon atoms. The first monomer is selected to impart a viscoelastic property to the composition. Suitable examples of such first monomers include isononyl acrylate, lauryl acrylate, decyl acrylate, isodecyl acrylate, tetradecyl acrylate, octadecyl acrylate and combinations thereof. Preferably the composition includes the first monomer in an amount of from 20 to 80 parts by weight, more preferably from about 30 to 65 parts by weight, based on the total weight of the composition.

The composition can also include a second monomer whose homopolymer has a Tg greater than 15° C. The second monomer has the formula $CH_2=CHCOOR^2$, where $R^2$ is an alkyl group having at least 9 carbon atoms. Preferably $R^2$ is a cyclic hydrocarbon having at least 9 carbon atoms. Examples of useful second monomers include isobornyl acrylate, dicyclopentadienyl acrylate, and 4-butylcyclohexyl acrylate, 4-isopropylcyclohexyl acrylate and combinations thereof. Preferably the composition includes the second monomer in an amount of from about 5 to about 50 parts by weight, more preferably from about 10 to about 35 parts by weight, most preferably from about 10 to about 30 parts by weight, based on the total weight of the composition. Preferred spin coatable adhesive compositions include from about 10 to about 40 parts by weight of the second monomer, based on the total weight of the composition. When the composition is formulated as a pressure sensitive adhesive composition, it preferably includes from about 5 to about 35 parts by weight of the second monomer, based on the total weight of the composition.

The composition can also include a third monomer whose homopolymer has a Tg greater than 15° C. The third monomer has the formula $CH_2=CHCONR^3R^4$, where $R^3$ is hydrogen or an alkyl group having from 1 to 10 carbon atoms and $R^4$ is an alkyl group, and when $R^3$ is hydrogen, $R^4$ is an alkyl group having from 8 to 16 carbon atoms, and when $R^3$ is an alkyl group having from 1 to 10 carbon atoms, $R^4$ is an alkyl group having a sufficient number of carbon atoms such that the sum of the carbon atoms of $R^3$ and $R^4$ is at least 8. Examples of useful acrylamide monomers include N-octyl acrylamide (NAO), N-methyl-N-octyl acrylamide, N,N-dibutyl acrylamide, N,N-dioctyl acrylamide, N-ethyl-N-decyl acrylamide, N-propyl-N-hexyl acrylamide and combinations thereof. The third monomer can be selected to add strength to the composition and to improve the adhesion of the adhesive composition to the substrate. The third monomer, when in the form of a solid, is selected to be soluble in the first monomer, the second monomer or a combination thereof. Preferably the composition includes the third monomer in an amount of from about 5 to about 60 parts by weight, more preferably from about 10 to about 30 parts by weight, based on the total weight of the composition.

The composition can also include i) a monomer having the formula $CH_2=CHCONHCR^5R^6COWP$, where $R^5$ and $R^6$ are alkyl groups having from 1 to 14 carbon atoms, cycloalkyl groups having from 3 to 14 carbon atoms, aryl groups having from 5 to 12 carbon atoms, an arene group having from 6 to 16 carbon atoms and no greater than 3 atoms selected from the group consisting of S, N, and non-peroxide O, or where $R^5$ and $R^6$ when taken together with the carbon atoms to which they are connected form a carboxylic ring having 4 to 12 carbon atoms, W is O, S, NH, or a divalent linking group, and P is $ArR^7$, where Ar is an arylene group and $R^7$ is a linear or branched alkyl or alkoxy group, an aryl group, or an alkarylene group such that the total number of carbon atoms in $ArR^7$ is at least 10, or

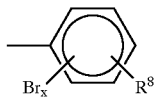

where x is from 1 to 4, and $R^8$ is a linear or branched alkyl group having at least 4 carbon atoms.

Examples of useful monomers i) include
$CH_2=CHCONHC(CH_3)_2COOCH_2CH_2—O—C_6H_4—C(CH_3)_2—C_6H_5$,
$CH_2=CHCONHC(CH_3)_2COOCH_2CH_2—O—C_6H_4—C(CH_3)_3$,
$CH_2=CHCONHC(CH_3)(C_2H_5)COOCH_2CH_2—O—C_6H_4—C(CH_3)_2—C_6H_5$,
$CH_2=CHCONHC(CH_3)(Ph)COOCH_2CH_2—O—C_6H_4—C(CH_3)_2—C_6H_5$,
$CH_2=CHCONHC(CH_3)(C_6H_4)COOCH2CH2—O—C_6H_4—C_5H_{11}$,
$CH_2=CHCONHC(CH_3)_2COOCH_2CH_2—O—C_6H_4—OC_8H_{17}$,
$CH_2=CHCONHC(CH_3)_2COOCH_2CH_2—O—C_6H_4—C_9H_{19}$,
$CH_2=CHCONHC(CH_3)_2COOCH_2CH_2—O—C_6H_4—C_{12}H_{25}$,
$CH_2=CHCONHC(CH_3)_2COOCH_2CH_2—O—C_6H_3(CH_3)C_3H_7$,
$CH_2=CHCONHC(CH_3)_2COOCH_2CH_2—O—C_6H_3(Br)C_4H_9$,
$CH_2=CHCONHC(CH_3)_2COOCH_2CH_2—O—C_6H_3(Br)C_{12}H_{25}$,
$CH_2=CHCONHC(CH_3)_2COOCH_2CH_2—O—C_6H_2(Br)_2C_4H_9$, and combinations thereof.

Preferably the composition includes monomer i) in an amount of from 0 to 50 parts by weight, and in some embodiments from about 10 to about 50 parts by weight, based on the total weight of the composition.

The composition can also include ii) a monomer having the formula:

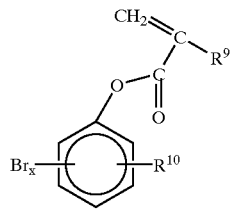

where $R^9$ is H or $CH_3$, x is from 1 to 4, preferably 2, and $R^{10}$ is a linear or branched alkyl group having at least 4 carbon atoms. Useful examples of such monomers include 2,6-dibromo-4-nonylphenyl acrylate, 2,6-dibromo-4-dodecylphenyl acrylate, 4,6-dibromo-2-dodecylphenyl acrylate, 4,6-dibromo-2-secbutyl-phenyl acrylate, and combinations thereof. Preferably the composition includes monomer ii) in an amount of from 0 to 50 parts by weight, and in some embodiments from about 10 to about 50 parts by weight, based on the total weight of the composition.

The composition can also include iii) a monomer having the formula $CH_2=CHCOO(R^{11})_nOCOCH=CH_2$, where $R^{11}$ is a linear or branched alkyl group and n is at least 6. Examples of suitable diacrylate monomers include 1,6-hexane diol diacrylate, 1,8-octane diol diacrylate, 1,10-decane diol diacrylate, 1,12-dodecane diol diacrylate, 1,14-tetradecane diol diacrylate, and combinations thereof. Preferably the composition includes monomer iii) in an amount of from 0 to about 5 parts by weight, more preferably 0 to about 2 parts by weight, based on the total weight of the composition.

Polymer

The composition can also include a polymer. Suitable polymers include any polymer having a number average molecular weight greater than 1500 g/mol that is soluble at room temperature in any monomers present in the composition. The type and amount of polymer can be selected to achieve a composition having a desired viscosity. For example, polymer can be added to the composition in an amount sufficient to increase the viscosity of the composition such that it is suitable for coating on a substrate, for example, spin coating onto an optical disc, for example, a DVD substrate. The polymer can also be selected to improve the cleavage strength of the adhesive composition, the adhesive composition's ability to adhere to a polycarbonate substrate, and the adhesive composition's ability to bond two polycarbonate substrates together. Polymer can also be added to the composition to modify the refractive index of the unpolymerized composition, the adhesive composition formed therefrom, or a combination thereof.

The polymer can formed from monomers that do not cause crazing in polycarbonate, monomers that cause crazing in polycarbonate, and combinations thereof. Suitable polymers include those that would not cause crazing in polycarbonate when present in the composition of the present invention after the composition was in contact with the polycarbonate for a period of 30 minutes at 25° C., more preferably after having been in contact with the composition for a period of 120 minutes, at 25° C., most preferably about 300 minutes at 25° C., and ambient relative humidity.

The polymer can also include functional end groups capable of associating with at least one of the monomers present in the composition, or the polymers formed during polymerization of the composition. Preferably the polymer includes functional groups that during polymerization of the composition are capable of associating with at least one monomer in the composition, preferably the first monomer, the second monomer, or a combination thereof, to form a film having a refractive index that corresponds to the refractive index of the polycarbonate substrate.

Examples of suitable polymers include polymers derived from monomers including $CH_2=CHCONHC(CH_3)_2COOCH_2CH_2—O—C_6H_5$, $CH_2=CHCONHC(CH_3)_2COOCH_2CH_2—S—C_6H_5$, $CH_2=CHCONHC(CH_3)_2COOCH_2CH_2—S—CH_2CH_3$, and combinations thereof.

Examples of useful low refractive index (i.e., no greater than 1.49) polymers include poly[methyl(meth) acrylate], poly[ethyl(meth) acrylate], poly[hexyl(meth) acrylate], poly[N-octyl(meth) acrylamide], and poly[isooctyl(meth) acrylate], copolymers thereof, and combinations thereof. Useful high refractive index (i.e., greater than 1.50) polymers include, for example, poly[phenoxyethyl(meth) acrylate], poly[phenyl(meth) acrylate], poly[benzyl(meth) acrylate], and poly[phenylthioethyl(meth) acrylate], copolymers thereof, and combinations thereof.

The monomers described in the Monomers section above can also be used to form the polymer. For example, the monomers can be pre-polymerized such that a relatively small amount of polymer is present in the composition. Examples of such pre-polymerization techniques are described in U.S. Pat. No. 4,181,752 (Martens et al.) and incorporated herein.

The polymer is preferably present in the composition in an amount such that the cured composition is homogeneous. Preferably the polymer is present in the composition in an amount of from about 2 to about 30 parts by weight, more preferably from about 5 to about 15 parts by weight, based on the total weight of the composition.

Particles

The composition can also include particles which may be dispersed in a liquid. Particles dispersed in a liquid are referred to as "sols" or "organosols." The particles can be selected to alter one or more property of the cured or uncured composition including, for example, refractive index, adhesive strength (for example, cleavage strength) and rheology, for example, viscosity. The particles are particularly useful for refractive index enhancement and rheology control.

The particles are selected such that the compositions are free from a degree of particle agglomeration or coagulation that would interfere with the desired properties of the composition. More preferably individual, unassociated (i.e., non-agglomerated and non-coagulated) particles are dispersed throughout the composition. The particles preferably do not irreversibly associate with each other. The term "associate with" or "associating with" includes, for example, covalently bonding and hydrogen bonding.

Useful particles include, for example, silica and metal oxide particles from metals such as zirconia, titania, ceria, and combinations thereof. Preferably, the particles have an average particle size less than about 200 nm, preferably less than about 100 nm, more preferably less than 50 nm, most preferably from about 10 to about 30 nm. In some embodiments, it is preferred to have particles having an average particle size less than about 20 nm. If the particles are agglomerated, the agglomerated particle size is within any of these preferable ranges.

Examples of useful commercially available silicas include nano-sized colloidal silicas available from Nalco Chemical Co., Naperville, Ill., under the product designations NALCO COLLOIDAL SILICAS 1040, 1050, 1060, 2327, and 2329.

Useful metal oxide sols include colloidal $ZrO_2$, suitable examples of which are described in U.S. Pat. No. 5,037,579 and incorporated herein, and colloidal $TiO_2$, suitable examples of which are described in PCT Application Serial No. US9815843, entitled, "Nanosize Metal Oxide Particles for Producing Transparent Metal Oxide Colloids and Ceramers," (Arney et al.) filed Jul. 30, 1998, which is incorporated herein by reference.

The particles can be surface modified, which can be achieved by attaching surface modifying agent(s) to the particle surface. The surface modifying agent(s) attached to the surface of the particle can modify the surface characteristics of the particles to achieve a variety of properties including, for example, to increase the compatibility of the particles with the components of the composition, to facilitate dispersion of the particles in the composition, and to enhance optical clarity of the composition and combinations thereof. The particles can also be surface-modified to include surface groups capable of associating with other components of the composition. When the composition is polymerized, for example, the surface groups can associate with at least one component of the composition to become part of the polymer network. Preferably the surface groups are capable of associating with the first monomer, the second monomer or a combination thereof. The particles can also be modified to include surface groups capable of associating with a monomer that causes crazing in polycarbonate to produce a composition that does not cause crazing in polycarbonate. Preferably the particles are surface-modified to include a combination of surface groups capable of providing compositions having desired dispersion, clarity, adhesive and rheological properties.

Schematically, surface modifying agents can be represented by the formula A-B where the A group is capable of attaching to the surface of the particle, and where the B group is a compatibilizing group that may be reactive or non-reactive with the components of the composition. Compatibilizing groups B that impart polar character to the particles include, for example, polyethers. Compatibilizing groups B that impart non-polar character to the particles include, for example, hydrocarbons.

Suitable surface-modifying agents include, for example, carboxylic acids, sulfonic acids, phosphonic acids, silanes, phosphates, and combinations thereof. Useful carboxylic acids include, for example, long chain aliphatic acids including octanoic acid, oleic acid, and combinations thereof.

Representative examples of polar modifying agents having carboxylic acid functionality include $CH_3O(CH_2CH_2O)_2CH_2COOH$ (hereafter MEEAA) and 2-(2-methoxyethoxy) acetic acid having the chemical structure $CH_3OCH_2CH_2OCH_2COOH$ (hereafter MEAA) and mono (polyethylene glycol) succinate. Representative examples of nonpolar surface modifying agents having carboxylic acid functionality include octanoic acid, dodecanoic acid and oleic acid.

Examples of useful silanes include organosilanes, for example, octylmethoxysilane, 3-methacryloyloxypropyl trimethoxy silane, 3-mercaptopropyltrimethoxysilane, n-octyl triethoxysilane, phenyl triethoxysilane, p-tolyltriethoxy silane, vinyl trimethoxy silane, and combinations thereof.

Examples of useful non-silane surface modifying agents capable of associating with organic components of the composition include acrylic acid, methacrylic acid, beta carboxyethyl acrylate, mono-2-(methacryloxyethyl) succinate, and combinations thereof. A useful surface modifying agent that imparts both polar character and reactivity to the particles is mono(methacryloxypoyethyleneglycol) succinate.

Useful zirconia particles include a combination of oleic acid and acrylic acid adsorbed onto the surface of the particle.

Useful silica particles include surface-modified with silane surface modifying agents including, for example, 3-methacryloyloxypropyl trimethoxy silane, 3-mercaptopropyltrimethoxysilane, n-octyl triethyoxysilane, and combinations thereof.

Particles can be surface modified using a variety of methods including, e.g., adding a surface modifying agent to particles (e.g., in the form of a powder or an aqueous sol) and allowing the surface modifying agent to react with the nanoparticles. A cosolvent can be added to the composition to increase the compatibility (e.g., solubility or miscibility) of the surface modifying agent, the monomers, or the surface modified particles with the aqueous mixture. The term "sol" refers to a dispersion or suspension of colloidal particles in an aqueous phase.

One particularly useful class of particles is the zirconia particles described in U.S. patent application Ser. No. 09/428,374, entitled, "Zirconia Sol," filed on Oct. 28, 1999, which is incorporated herein by reference.

Suitable zirconia sols may comprise a plurality of single crystal zirconia particles having an average primary particle size of about 20 nm or less, more preferably, having an average primary particle size ranging from about 7–20 nm. As used herein, the term "primary particle size" refers to the size of a non-associated single crystal zirconia particle. Primary particle size is determined by x-ray diffraction as described in the Crystallite Particle Size and Crystal Form Content Test Procedure (CPSCFCC).

The CPSCFCC is described herein. First, the particle size of dried zirconia sample was reduced by hand grinding using an agate mortar and pestle. A liberal amount of the sample was applied by spatula to a glass microscope slide on which a section of double coated tape had been adhered and pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were remove by forcefully tapping the microscope slide against a hard surface. In a similar manner, corundum (Linde 1.0 μm alumina polishing powder, Lot Number C062, Union Carbide, Indianapolis, Ind.) was prepared and used to calibrate diffractometer for instrumental broadening.

X-ray diffraction scans were obtained from by use of a diffractometer employing copper $K_\alpha$ radiation and Inel CPS120 (Inel Inc, Stratham, N.H.) position sensitive detector registry of the scattered radiation. The detector has a nominal angular resolution of 0.03 degrees (2θ) and received scattering data from 0 to 115 degree (2θ). The X-ray generator was operated at a setting of 40 kV and 10 mA and fixed incident beam slits were used. Data was collected for 60 minutes at a fixed take-off (incident) angle of 6 degrees. Data collections for the corundum standard were conducted on three separate areas of several individual corundum mounts. Data was collected on three separate areas of the thin layer sample mount.

Observed diffraction peaks were identified by comparison to the reference diffraction patterns contained within the ICDD powder diffraction database (sets 1–47, International Center for Diffraction Data, Newton Square, Pa.) and attributed to either cubic/tetragonal (C/T) or monoclinic (M) forms of zirconia. The amounts of each zirconia form were evaluated on a relative basis and the form of zirconia having the most intense diffraction peak was assigned the relative intensity value of 100. The strongest line of each of the remaining crystalline zirconia forms were scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting observed diffraction peaks. The following peak widths were evaluated depending on the zirconia phase found to be present:

cubic/tetragonal (C/T): (1 1 1)

monoclinic (M): (−1 1 1), and (1 1 1)

Peak widths were found as the peak full width at half maximum (FWHM) having units of degrees using a Pearson VII peak shape model, with $K_{\alpha a}$ and $K_{\alpha 2}$ wavelength components accounted for, and linear background model. The profile fitting was accomplished by use of the capabilities of the JADE (version 3.1, Materials Data Inc., Livermore, Calif.) diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. Corrected sample peak width (β) were used to evaluate primary crystal (crysallite) size by application of the Scherrer equation. The arithmetic mean of the cubic/tetragonal (C/T) and monoclinic phases (M) were calculated.

β=[calculated peak *FWHM*−instrumental breadth](converted to radians) Crystallite Size $(D)=K\lambda/\beta(\cos \theta)$ where:

K=form factor (here 0.9);

λ=wavelength (1.540598 Å);

β=calculated peak width after correction for instrumental broadening (in radians); and θ=½ the peak position (scattering angle).

Cubic/Tetragonal Mean Crystallite Size=$[D(1\ 1\ 1)_{area1}+D(1\ 1\ 1)_{area2}+D(1\ 1\ 1)_{area3}]/3$ Monoclinic Mean Crystallite Size=$[D(-1\ 1\ 1)_{area1}+D(-1\ 1\ 1)_{area2}+D(-1\ 1\ 1)_{area3}+D(1\ 1\ 1)_{area1}+D(1\ 1\ 1)_{area2}+D(1\ 1\ 1)_{area3}]/6$ The crystallite size is reported in the format:

[C/T crystallite size](parts C/T)+[M crystallite size](parts M)

Weighted average=$[(\% \ C/T)(C/T\ size)+(\% \ M)(M\ size)]/100$ where:

% C/T=the percent crystallinity contributed by the cubic and tetragonal crystallite content of the $ZrO_2$ sol;

C/T size=the size of the cubic and tetragonal crystallites;

% M=the percent crystallinity contributed by the monoclinic crystallite content of the $ZrO_2$ sol; and M size=the size of the monoclinic crystallites.

Suitable zirconia sols may comprise zirconia particles which are highly crystalline in nature. Crystallinity of zirconia particles may be quantified, for example, using a crystallinity index. Crystallinity index is calculated by dividing the x-ray scattering intensity of the sample material by the x-ray scattering intensity of a known crystalline standard material, for example, calcium stabilized zirconium oxide. Crystallinity index of zirconia particles may be determined in accordance with a Crystallinity Index Test Procedure.

In the Crystallinity Index Test Procedure, particle size of the phase standard (zirconium oxide, calcium stabilized Z-1083 Lot Number 173077-A-1, CERAC Inc, Milwaukee, Wis.) was reduced by ball milling and/or hand grinding using a boron carbide mortar and pestle to pass 325 mesh sieve. Individual mixtures were prepared consisting of 0.400 grams of sample and 0.100 grams of mass standard, a material incorporated into samples being evaluated for crystallinity index to normalize X-ray intensity values based on amount of material present in a sample. Tungsten metal powder (<3 μm) was the mass standard used. Mixtures of the samples were blended under ethanol using an agate mortar and pestle and allowed to dry under flowing nitrogen. A similar mixture composed of the phase standard was also prepared to serve as the crystallinity index reference. The dried mixtures were removed from the mortar and pestle by spatula and fine brush and subsequently transferred to individual sample containers. Portions of each sample were prepared as ethanol slurries on sample holders containing flush mounted glass inserts. Multiple X-ray diffraction scans (a minimum or 10 scans for both sample and standard) were obtained from each sample and phase standard mixture by use of a vertical Bragg-Bretano diffractometer (constructed by Philips Electronic Instruments, Mahwah, N.J.) employing copper $K_\alpha$ radiation, variable incident slit, fixed exit slit, graphite diffracted beam monochromator, and proportional counter registry of the scattered radiation. Scans were conducted from 25–55 degree (2θ) employing a 0.04 degree step size. A 8 second dwell time was used for standard mixture while a 20 second dwell time was employed for sample mixtures to improve counting statistics. The X-ray generator (Spellman High Voltage Electronics Corporation, Hauppage, N.Y.) was operated at a setting of 40 kV and 20 mA. Peak areas for the observed diffraction maxima due to zirconia and tungsten phases were measured by profile fitting observed diffraction peaks within the 25–55 degree (2θ) scattering angle range. The following peak areas were evaluated depending on the zirconia phase found to be present:

| | |
|---|---|
| cubic (C) | (1 1 1), (2 0 0), and (2 2 0) |
| tetragonal (T) | (1 0 1), (0 0 2)/(1 1 0), and (1 1 2)/(2 0 0) |
| monoclinic (M) | (-1 1 1), (1 1 1), (0 0 2), (0 2 0), and (2 0 0) |

The X-ray scattering of internal mass standard was evaluated by measurement of cubic tungsten (1 1 0) peak area. A Pearson VII peak shape model and linear background model were employed in all cases. The profile fitting was accomplished by use of the capabilities of the JADE (version 3.1, Materials Data Inc. Livermore, Calif.) diffraction software suite. The peak areas of zirconia peaks outlined above were summed to produce a total zirconia scattered intensity value [(Zirconia Area)$_{sample}$] for each sample as well as standard [(Zirconia Area)$_{standard}$]. These total zirconia scattered intensity values were divided by respective cubic tungsten (1 1 0) peak areas to produce the ratio [$R_{sample}$] for each sample as well as the phase standard [$R_{standard}$]. The arithmetic mean of $R_{sample}$ and $R_{standard}$ are calculated using individual values obtained from the multiple runs of sample and standard, respectively. The crystallinity index [$X_c$] for each sample was calculated as the ratio of $R_{sample(mean)}$ to $R_{standard(mean)}$.

$$R_{sample(i)} = [(\text{Total Zirconia Area})_{sample}]/[(\text{Tungsten Area})_{sample}]$$

$$R_{standard(i)} = [(\text{Total Zirconia Area})_{standard}]/[(\text{Tungsten Area})_{standard}]$$

$$R_{sample(mean)} = [\Sigma R_{sample(i)}]/N_{sample}$$

where
  $N_{sample}$ = number of sample scans $$R_{standard(mean)} = [\Sigma R_{standard(i)}]/N_{standard}$$

where
  $N_{standard}$ = number standard scans
  $X_c = R_{sample(mean)}/R_{standard(mean)}$ Suitable zirconia particles have a crystallinity index of about 0.65 or greater as measured using the Crystallinity Index Test Procedure. More preferably, the zirconia particles having a crystallinity index of about 0.75 or greater, most preferably about 0.85 or greater as measured using the Crystallinity Index Test Procedure.

Of the crystalline portion of the zirconia particles, the predominate crystal lattice forms are cubic and tetragonal with a minor amount of monoclinic phase also being present. Due to the difficulty in separately quantifying cubic and tetragonal crystal lattice structures using x-ray diffraction, the two have been combined and are reported herein as combined cubic and tetragonal. Specifically, the zirconia particles comprise about 70% or greater combined cubic and tetragonal crystal lattice structure. More preferably, the zirconia particles comprise about 75% or greater combined cubic and tetragonal crystal lattice structure, and most preferably comprise about 85% or greater combined cubic and tetragonal crystal lattice structure. In each instance, the balance of the crystalline phase is in the monoclinic crystal lattice structure.

Due to their very small size, the zirconia particles exist in predominantly cubic and tetragonal crystal lattice phases without need for an effective amount of a crystal phase stabilizer. As used herein the term "crystal phase stabilizer" refers to a material which may be added to stabilize zirconia in the cubic and/or tetragonal crystal lattice structure. Specifically, crystal phase stabilizers function to suppress transformation from the cubic and/or tetragonal phase to the monoclinic phase. Crystal phase stabilizers include, for example, alkaline-earth oxides such as MgO and CaO, rare earth oxides (i.e., lanthanides) and $Y_2O_3$. As used herein the term "an effective amount" refers to the amount of crystal phase stabilizer necessary to suppress transformation of zirconia from the cubic and/or tetragonal phase to the monoclinic phase. In a preferred embodiment, the zirconia particles comprise less than about 1 wt. % of a crystal phase stabilizer, more preferably less than about 0.1 wt. % of a crystal phase stabilizer.

In suitable zirconia sols, the primary particles of zirconia exist in a substantially non-associated (i.e., non-aggregated and non-agglomerated) form. A quantitative measure of the degree of association between the primary particles in the sol is the dispersion index. As used herein the "dispersion index" is defined as the hydrodynamic particle size divided by the primary particle size. The primary particle size is determined using x-ray diffraction techniques as described in CPSCFCC. Hydrodynamic particle size refers to the weight average particle size of the zirconia particles in the aqueous phase as measured by Photon Correlation Spectroscopy (PCS).

The PCS procedure entails using a Coulter N4 Submicron Particle Sizer (available from Coulter Corporation, Miami Fla.). Dilute zirconia sol samples are filtered through a 0.45 μm filter using syringe-applied pressure into a glass cuvette. The remaining volume of the cuvette is filled with water, covered, and repeatedly inverted to remove air bubbles. The cuvette is wiped down to remove fingerprints and dust prior to taking any measurements. Light scattering intensity is measured to ensure that an appropriate concentration of sol was sampled. If the intensity is too high, a portion of the cuvette's contents is removed and the remaining contents are diluted with water. If the intensity is too low, several more drops of filtered sol are added to the sample and the solution mixed by repeatedly inverting the cuvette. Prior to starting data acquisition the temperature of the sample chamber was allowed to equilibrate for 5 minutes at 25° C. The supplied software is used to do a SDP analysis (1.0 nm–1000 nm) with an angle of 90°. The analysis can be performed using 25 data bins. The following values are used in the calculations: refractive index of water=1.333, viscosity of water 0.890 cP, and refractive index for zirconia particles=1.9. Data acquisition immediately ensued for a period of 3:20 minutes. The reported PCS number is the mean diameter based on weight analysis that results from this procedure.

If the primary particles are associated, PCS provides a measure of the size of the aggregates and/or agglomerates of primary particles in the zirconia sol. If the particles are non-associated, PCS provides a measure of the size of the primary particles. Accordingly, as the association between primary particles in the sol decreases the dispersion index approaches a value of 1. The primary zirconia particles preferably exist in a sol in a substantially non-associated form resulting in a zirconia sol having a dispersion index ranging from about 1–3, more preferably ranging from about 1–2.5, and most preferably ranging from about 1–2.

Zirconia sols may be characterized in part as having a high optical transmission due to the small size and non-associated form of the primary zirconia particles in the sol. High optical transmission of the sol is an important characteristic in preparing transparent or translucent zirconia-filled composite materials. As used herein, "optical transmission" refers to the amount of light that passes through a sample (e.g., a zirconia sol) devided by the total amount of light incident upon the sample and may be calculated using the following equation:

%Transmission=(I/I$_o$)

where

I is the light intensity passing though the sample; and

I$_o$ is the light intensity incident on the sample.

Optical transmission may be determined using an ultraviolet/visible spectrophotometer such as that commercially available as Model 6-550 Pye Unicam (from Pye Unicam Ltd., Cambridge England).

For zirconia sols having a percent zirconia of about 1.28 wt.%, the optical transmission is preferably about 70% or greater, more preferably about 80% or greater, and most preferably about 90% or greater when tested in accordance with Test Procedure 2. For zirconia sols having a percent zirconia of about 10 wt.%, the optical transmission is preferably about 20% or greater, more preferably about 50% or greater, and most preferably about 70% or greater when tested in accordance with Test Procedure 2.

Suitable starting materials for preparing polyether acid zirconium salts include basic zirconium salts such as zirconium carboxylates and basic zirconium salts having counterions that may be displaced with carboxylic acids. Representative examples of basic zirconium salts having counterions that may be displaced with carboxylic acids include zirconium oxynitrate, zirconium oxychloride and zirconium carbonates. Basic zirconium salts are salts of zirconium wherein at least a portion of the cationic charge on the zirconium is compensated by hydroxide or an O$^{2-}$ anion. Because it is difficult in practice to determine whether the oxygen content in basic zirconium salts arises from bound hydroxide or O$^{2-}$, it is common to represent this oxygen content as simply oxygen. Thus, formula (1) set forth below is presented with bound water excluded for simplicity and represents a general formula for zirconium compounds that may be suitable as starting materials for preparing polyether acid zirconium salts.

$$ZrO_{(4-n/2)}(X)_n$$

where:

X is a carboxylic acid displaceable counterion; and n ranges from 0.5 to 4.

Representative examples of carboxylic acid displaceable counterions include carboxylates such as acetates, formates and propionates and other counterions such as nitrate, chloride, carbonate or a combination thereof. Zirconium alkoxides, although not formally zirconium salts, may be used as starting materials in the formation of the polyether acid zirconium after initial reaction with a suitable acid to form a basic zirconium salt.

A preferred starting material is an aqueous solution or sol of basic zirconium acetate having the general formula ZrO$_{(4-n/2)}$(CH$_3$COOO)$_n$, where n ranges from about 1–2. In aqueous solutions, zirconium acetate probably exists as complex polynuclear zirconium cation. Processes for making zirconium acetate are well known in the art (see, for example, W.B. Blumenthal, "The Chemical Behavior of Zirconium", D. Van Nostrand Company, Princeton, N.J. pp. 311–338). Suitable zirconium acetate solutions comprise from about 5–40 wt.% as ZrO$_2$ and range from about 5–40 wt.% acetate. A preferred zirconium acetate sol starting material comprises ZrO$_{1.25}$(C$_2$H$_3$O$_2$)$_{1.5}$ at 20 wt.% ZrO$_2$ and is commercially available under the trade designation "Nyacol ZrO$_2$(Ac)" from Nyacol Products Corporation, Ashland, Mass.

In a preferred process of making a zirconia sol, a polyether acid zirconium salt is prepared by reacting, in an aqueous solution, a zirconium salt with a polyether carboxylic acid. As presently understood, the polyether carboxylic acid is believed to function to prevent association (i.e., agglomeration and/or aggregation) of the zirconia particles as they are formed during the hydrolysis reaction. In this way, the zirconia particles produced are substantially non-associated. The term "association" or "associated" as used herein refers to a grouping of two or more primary particles that are aggregated and/or agglomerated. The term "aggregation" as used herein is descriptive of a strong association between primary particles which may be chemically bound to one another. The breakdown of aggregates into smaller particles is difficult to achieve. The term "agglomeration" as used herein is descriptive of a weak association of primary particles which may be held together by charge or polarity.

Polyether carboxylic acids suitable for use as modifiers in the present invention are water soluble monocarboxylic acids (i.e., containing one carboxylic acid group per molecule) having a polyether tail. The polyether tail comprises repeating difunctional alkoxy radicals having the general formula —O—R—. Preferred R groups have the general formula—$C_nH_{2n}$—and include, for example, methylene, ethylene and propylene (including n-propylene and i-propylene) or a combination thereof. Combinations of R groups may be provided, for example, as random, or block type copolymers.

A preferred class of monovalent polyether radicals may be represented generally by formula (3):

$$CH_3\text{-}[O\text{-}(CH_2)_y]_x\text{—}X\text{—}COOH \quad (3)$$

where:

X is a divalent organic linking group;

x ranges from about 1–10; and y ranges from about 1–4.

Representative examples of X include—$X_2$—$(CH_2)_n$— where $X_2$ is —O— —S—, —C(O)O—, —C(O)NH— and wherein n ranges from about 1–3.

Examples of preferred polyether carboxylic acids include 2-[2-(2-methoxyethoxy)ethoxy] acetic acid having the chemical structure $CH_3O(CH_2CH_2O)_2CH_2COOH$ (MEEAA) and 2-(2-methoxyethoxy) acetic acid having the chemical structure $CH_3OCH_2CH_2OCH_2COOH$ (MEAA). MEAA and MEEAA are commercially from Aldrich Chemical Co., Milwaukee, Wis. and catalog numbers 40,701-1 and 40,700-3, respectively. A mixture of more than one polyether carboxylic acid may be used.

Reaction of the polyether carboxylic acid with a zirconium salt following reaction sequence (1):

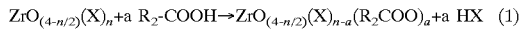

$$ZrO_{(4-n/2)}(X)_n + a\ R_2\text{-}COOH \rightarrow ZrO_{(4-n/2)}(X)_{n-a}(R_2COO)_a + a\ HX \quad (1)$$

results in the formation of a polyether acid zirconium salt having the general formula $ZrO_{(4-n/2)(X)n-a}(R_2COO)_a$ and liberates (i.e., releases) approximately a stochiometric amount of an acid having the general formula HX. By way of example, when the zirconium salt comprises zirconium acetate $ZrO_{(4-n/2)}(C_2H_3O_2)_n)$ a near stochiometric amount of acetic acid ($C_2H_3O_2$) is released as a result of the formation of the polyether acid zirconium salt (see, reaction sequence 1a).

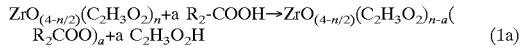

$$ZrO_{(4-n/2)}(C_2H_3O_2)_n + a\ R_2\text{-}COOH \rightarrow ZrO_{(4-n/2)}(C_2H_3O_2)_{n-a}(R_2COO)_a + a\ C_2H_3O_2H \quad (1a)$$

Salts of zirconium with carboxylic acids are not dissociated in the aqueous phase as the acid is bound to the zirconium atom. The carboxylic acid effects the water solubility of the salt. Attachment of hydrophobic acids (e.g., alkyl acids) to the zirconium causes the salts to be insoluable in water. In fact, even the addition of small acids such as propionic acid and acrylic acid cause the salt to be insolulbe in water. In contrast, the polyether acids used in the present invention allow higher molecular weight acids to be used while maintaining the water solubility of the polyether acid zirconium salt. This in turn allows hydrothermal treatment of the dissolved polyether acid zirconium salt in the aqueous phase.

Typically, relative to the zirconium salt starting material, the polyether carboxylic acid is added in an amount ranging from about 2.5–5.0 millimoles per gram equivalent of $ZrO_2$ in the zirconium salt. For the preferred zirconium acetate starting material (i.e., Nyacol $ZrO_2(Ac)$), this range results in the displacement of about 20–50% of the acetate groups. Preferably, the amount of polyether carboxylic acid added should be limited to the minimum necessary to prevent association of resulting zirconia particles. In this way, the amount of acid released during formation of the polyether acid zirconium salt is kept to a minimum. The amount of polyether carboxylic acid added may depend upon such factors as, for example, the molecular weight of the polyether carboxylic acid, the concentration, time and temperature during the hydrolysis reaction.

Typically, the polyether carboxylic acid is added to an aqueous solution of the zirconium salt and the resulting solution is stirred at room temperature for about 30–60 minutes. The polyether carboxylic acid molecules react with the zirconium salt displacing and substituting for at least a portion of the acid groups bound to the zirconium salt. The displaced acid groups are released into the solution as free acid. It will ordinarily be preferred to remove at least a portion of the acid, more preferably substantially all of the acid released during the formation of the polyether acid zirconium salt. It should be noted that removal of the acid may function to shift the reaction equilibrium towards formation of the polyether acid zirconium salt. Suitable techniques for removing the excess acid are known in the art and include, for example, drying or distillation. When the liberated acid has a low boiling point (e.g., <about 175° C.), it may be removed by heating the solution until the aqueous phase evaporates leaving a residue of the polyether acid zirconium salt. The polyether acid zirconium salt must then be dissolved in water prior to hydrolysis.

After formation of the polyether acid zirconium salt and, preferably, removal of the liberated acid, the next step is to hydrolyze an aqueous solution of the polyether acid zirconium salt under conditions sufficient to convert the polyether acid zirconium salt into crystalline zirconia particles. By way of example, when the polyether acid zirconium salt is derived from the acetate salt (see, reaction sequence 1a), the hydrolysis step follows general reaction sequence (2a):

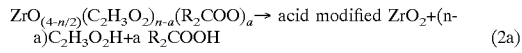

$$ZrO_{(4-n/2)}(C_2H_3O_2)_{n-a}(R_2COO)_a \rightarrow \text{acid modified } ZrO_2 + (n-a)C_2H_3O_2H + R_2COOH \quad (2a)$$

The hydrolysis reaction forms acid modified zirconia particles and also produces free carboxylic acids (i.e., $C_2H_3O_2H$ and $R_2COOH$) as a by product. Therefore, the resultant zirconia sol comprises the acid modified zirconia particles and a mixture of two carboxylic acids in water. By acid modified zirconia particles it is meant that at least a fraction of the acids are adsorbed to the surface of the zirconia particles.

The hydrolysis reaction of the polyether acid zirconium salt solution may take place in any suitable reaction vessel. Since the reaction is typically performed under high temperatures and pressures, an autoclave will generally be the preferred type of reaction vessel. One example of a preferred reaction vessel is commercially available as Pressure Reactor Series #4520" from Parr Instruments Co., Moline, Ill.

In operation, an aqueous solution of the polyether acid zirconium salt is first charged into a reaction vessel. The concentration of the polyether acid zirconium salt solution is typically in the range of 0.5–3 wt.% $ZrO_2$, preferably in the range of 1–2 wt.% $ZrO_2$. However, the concentration may be varied through a wider range depending upon the other reaction conditions. The polyether acid zirconium salt solution is then heated to a temperature sufficient to convert it into zirconia particles. Preferred hydrolysis temperatures range from about 140–250° C., more preferably ranging from about 150–200° C. Typically the reaction vessel is heated to the desired hydrolysis temperature over a period of several hours. Among other considerations, a suitable hydrolysis temperature or temperature range, may be selected in order to minimize degradation and/or decomposition of the polyether carboxylic acid. The pressure maintained in the reaction vessel may be the autogenous pressure (i.e., the vapor pressure of water at the temperature of the reaction) or, preferably, the reactin vessel may be pressured, for example, with an inert gas such as nitrogen. Preferred pressures range from about 1–30 bars, preferably 2–20 bars. Pressurization of the reaction vessel is believed to reduce or eliminate refluxing of the polyether acid zirconium salt solution within the reaction vessel which may deleteriously affect the properties of the resulting zirconia sol. The time of hydrolysis is typically a function of the hydrolysis temperature and the concentration of the salt solution. Heat is typically applied until the hydrolysis reaction is substantially complete. Generally, the time involved is in the range of about 16–24 hours at a temperature of about 175° C., however, longer or shorter times may also be suitable. The reaction may be monitored by examining the resulting zirconia particles using x-ray diffraction or by examining the amount of free acid in the water phase using IR spectroscopy of HPLC. Upon completion of the hydrolysis, the pressure vessel is allowed to cool and the resulting zirconia sol is removed from the reaction vessel. Although the procedure described above is a batchwise process, it is also within the scope of this invention to conduct the hydrolysis in a contiguous process.

Zirconia sols may be concentrated by removing at least a portion of the liquid phase using techniques well known in the art, for example, evaporation or ultra-filtration. In a preferred method the zirconia sols are concentrated to about 10–40 wt.% $ZrO_2$ using a ratary evaporator.

Zirconia sols prepared in accordance with this method typically contain an excess of acid over that normally desired (see, reaction sequence 2a). When it is desired to combine a zirconia sol with, for example, a composition of the present invention, it will typically be necessary to remove at least a portion of, more preferably substantially all of, the free acid present in the sol. Typically, the acid may be removed by such conventional methods as drying, dialysis, precipitation, ion exchange, distillation or diafiltration.

Due to the formation of free acid during the hydrolysis reaction, the pH of the as prepared zirconia sols typically ranges from about 1.8–2.2. Dialysis may be used to increase the pH of the sols. Dialyzed sols typically have a pH ranging about 1–4.5, or greater, depending upon the extent of the dialysis. The pH of the sols may also be adjusted by the addition of acids (e.g., concentrated HCl and glacial acetic) and/or base (e.g., aqueous ammonia). Addition of aqueous ammonia has resulted in clear sol to at least pH 6–7.

Dialysis, ion exchange and diafiltration methods may be used to remove the free acid without substantially changing the ratio of the acids adsorbed to the surface of the zirconia particles. Alternatively, removal of excess acid and concentration of the sol may be achieved by first evaporating the water and free acid from the sol to obtain a dry powder. The dry powder may then be redispersed in a desired amount of water to obtain a concentrated sol substantially free of excess acid. It should be noted, however, that this technique may change the ratio of the acids adsorbed to the surface of the zirconia particles in such a way that the ratio of the higher boiling acid to the lower boiling acid is increased.

Optionally, after formation of the zirconia sol, the polyether carboxylic acid groups may be removed or displaced from the zirconia particles of the sol. Removal of the polyether carboxylic acid groups may be advantageous, for example, when the polyether groups would be incompatible with an organic matrix material to which it is desired to add the zirconium sol. Displacement of the polyether carboxylic acid groups may be accomplished, for example, by displacing the polyether acid from the zirconia particles with a carboxylic acid, for example, acetic acid. The carboxylic acid displaces and substitutes for the polyether carboxylic acid groups on the zirconia particles. After displacement, the free polyether carboxylic acid may be removed from the sol using techniques known in the art, for example, dialysis or diafiltration.

Various methods may be employed to combine the sols with the composition. In one aspect, a solvent exchange procedure may be utilized. In the solvent exchange procedure the components of the composition (for example, the monomers) are first added to the surface modified sol. Optionally, prior to addition of the components, a cosolvent, for example, methoxy-2-propanol or N-methyl pyrolidone, may be added to an aqueous sol to help miscibilize the organic components in the water. After addition of the organic components, the water and cosolvent are removed via evaporation, thus leaving the particles dispersed in the composition. The evaporation step may be accomplished, for example, via distillation, rotary evaporation or oven drying.

Another method for incorporating sols into an organic composition includes drying the particles into a powder, followed by the addition of the components of the composition into which the particles are to be dispersed. The drying step may be accomplished by conventional means such as oven drying or spray drying.

Particles that are particularly useful in optical recording medium applications, for examples, are surface-modified such that the composition exhibits a refractive index of no greater than about +/−10% of the refractive index of the DVD substrate, more preferably no greater than +/−5% of the refractive index of the DVD substrate.

Particles can be added to the composition in the form of a sol in amounts sufficient to achieve compositions having desired properties. Preferably particles are added to the composition in an amount of from about 5 to about 70 parts by weight, more preferably from about 20 to about 60 parts by weight, based on the total weight of the composition.

Use

The compositions are useful in a variety of applications. The compositions can be coated on a substrate, for example, polycarbonate or a release liner, and subjected to actinic or thermal radiation to polymerize the monomers and form a cured composition. The monomer mixture can be polymerized by various conventional free radical polymerization methods, whether thermally or radiation initiated, including, for example solvent polymerization, emulsion polymerization, bulk polymerization and radiation polymerization including processes using ultraviolet light, electron beam radiation, and gamma radiation.

Useful free radical initiators include thermal and photoactive initiators. The type of initiator used depends on the polymerization process. Preferably the initiator is a photoinitiator and is capable of being activated by UV radiation, for example, at wavelengths from about 250 nm to about 450 nm, more preferably at about 350 nm. Useful photoinitiators include, for example, benzoin ethers such as benzoin methyl ether and benzoin isopropyl ether, substituted benzoin ethers such as anisoin methyl ether, substituted acetophenones such as 2,2-dimethoxy-2-phenylacetophenone, an substituted alpha-ketols such as 2-methyl-2-hydroxypropiophenone.

Examples of commercially available photoinitiators include photoinitiators available under the trade designations "Irgacure 651", "Irgacure 819" and "Darocur 1173", which are available from Ciba-Geigy Corp., Hawthorne, N.Y., and under the trade designation "Lucern TPO" from BASF, Parsippany, N.J.

Also, copolymeric photoinitators are useful. Suitable polymerizable photoinitiators include, for example, 2-[4-(2-hydroxy-2-methylpropenoyl)phenoxy]ethyl-2-methyl-2-N-propenoyl amino propanoate (PIA) and the polymerizable photoinitiator available under the trade designation "DAROCURE ZLI 3331" (available from Ciba-Geigy).

Examples of suitable thermal initiators include peroxides such as benzoyl peroxide, dibenzoyl peroxzide, dilauryl peroxide, cyclohexane peroxide, methyl ethyl ketone peroxide, hydroperoxides, for example, tert-butyl hydroperoxide and cumene hydroperoxide, dicylohexyl peroxydicarbonate, t-butyl perbenzoate, and azo compounds, for example, 2,2,-azo-bis(isobutyronitrile) (AIBN). Examples of commercially available thermal initiators include initiators available from DuPont Specialty Chemical (Wilmington, Del.) under the "VAZO" trade designation including "VAZO 64" (2,2'-azo-bis (isobutyronitrile)) and "VAZO 52" as well as the thermal initiator under the trade designation "Lucidol 70" available from Elf Atochem North America, Philadelphia, Pa.

An initiator is used in an amount effective to facilitate polymerization of the monomers and the amount will vary depending upon, for example, the type of initiator, the molecular weight of the initiator, the intended application of the resulting adhesive composition and the polymerization process. The initiators can be used in amounts from about 0.001 parts by weight to about 5 parts by weight based on 100 parts cured composition. Preferred amounts range from about 0.05 parts by weight to about 3 parts by weight.

Composition may be crosslinked to improve adhesive properties. Crosslinking can be achieved without a crosslinking agent by using high energy electromagnetic radiation such as gamma or electron beam radiation. In addition, a crosslinking agent, or a combination of crosslinking agents can be added to the mixture of polymerizable monomers to facilitate crosslinking.

Useful cross-linking agents for radiation curing include multifunctional acrylates, such as those disclosed in U.S. Pat. No. 4,379,201 (Heilmann et al.), which include 1,6-hexanediol diacrylate, trimethylopropane triacrylate, 1,2-ethylene glycol diacrylate, pentaerythritol tetracylate, 1,12-dodecanol diacrylate, and combinations thereof, and co-polymerizable aromatic ketone co-monomers such as those disclosed in U.S. Pat. No. 4,737,559 (Kellen et al.), both of which are incorporated by reference. Various other crosslinking agents with different molecular weights between (meth)acrylate (i.e., acrylate and methacrylate) functionality would also be useful. Suitable ultraviolet light sources are, for example, medium pressure mercury lamps and ultraviolet black light.

Generally, when a crosslinking agent is used, the crosslinking agent is present in an amount of about 0.01 parts to about 5 parts by weight based on 100 parts cured composition, preferably about 0.05 parts by weight to about 0.3 parts by weight crosslinking agent.

Preferred chain transfer agents are soluble in the monomer mixture prior to polymerization. Examples of suitable chain transfer agents include triethyl silane and mercaptans.

Other materials that can be blended with the composition prior to coating include polymers, tackifying resins, pigments, thermally conductive particulates, electrically conductive particulates, antioxidants, glass or polymeric microspheres, expanded or unexpanded polymeric microspheres, antistatic agents, plasticizers, and combinations thereof. Preferably the other materials and amounts thereof are selected such that the resulting composition satisfies the optical requirements of the intended use.

The compositions are particularly well suited for use with polycarbonate substrates. The polycarbonate substrates, in turn, may be used in a variety of articles including, for example, optical recording media such as, for example, DVD, DVD-R, DVD-RW, DVD-RAM, DVD Audio, DVR and DVD hybrids. The formats for DVDs have been defined by an industry consortium (ECMA, Executive Committee of DVD Consortium as ECMA/TC 31/97/2, Geneva Switzerland, January 1997). DVDs can be divided into DVD-ROMs, which are exclusively for reproduction, DVD-RAMs, which can be used for data storage, and DVD-Rs, which are recordable once (write once, read many). Using a light beam (light radiation) information can be read out from a DVR and/or information can be recorded to a DVR.

Polycarbonate substrates are available in a variety of dimensions and shapes including, for example, a disc, and can include data molded into the polycarbonate substrate. The inorganic surface layer can include, for example, metal (for example, aluminum, silver, brass, gold, a gold alloy, copper, a copper-zinc alloy, a copper-aluminum alloy, an alloy that includes aluminum and a refractory metal, for example, molybdenum, tantalum, cobalt, chromium, titanium and platinum), $Si_nX_m$, where X is oxygen, nitrogen, or carbon, and $\Sigma(n+m)$ satisfies the valence requirements of Si and X (for example, silicon oxide and silicon carbide), and combinations thereof. The inorganic surface layer may be semi-transparent, i.e., exhibits a reflectivity of from 18 to 30% as measured according to the ECMA Standard Reflectivity Test Method for 210 mm DVD-ROM. Gold, silicon oxide, and silicon carbide are examples of compounds that are used to form semi-transparent layers on polycarbonate surfaces.

Examples of commercially available polycarbonate substrates include the polycarbonate discs used in digital versatile discs. The disc-shaped substrates can have a center hold, which is useful for centering the DVDs that are assembled therefrom in a recording or playing station. The disc-shaped substrates can include an outer diameter of about 50 to about 360 mm, an inner diameter of about 5 to 35 mm, and a thickness of between about 0.25 and 1.2 mm.

The invention will now be described further by way of the following examples. All parts, ratios, percents and amounts stated in the Examples are by weight unless otherwise specified.

EXAMPLES

Test Procedures

Test procedures used in the examples are described below.
Cleavage Strength Test Method The following method is used to determine bond strength of adhesively bonded DVDs.

A pair of DVD halves are bonded to form a DVD disc. A circular spot about 1.2 mm diameter is etched into the DVD surface at the very edge of the bonded DVD by wiping the DVD surface with a toluene-saturated cotton swab. The swabbed surface changes in opacity and is noticeably roughened. The treated surface is allowed to air dry. The edge of the treated DVD at the treatment area is covered with a piece of 3M 851 silicone pressure sensitive adhesive. The tape is rubbed to secure the tape to the DVD edge. The tape is applied such that it extends about ⅜ in above the plane of the DVD, thereby serving to mask the DVD edge/bond line and to serve as a protective dam for the next procedural step. Approximately 2 ml of an adhesive available from Minnesota Mining and Manufacturing Company (3M), St. Paul, Minn. under the trade designation "Scotch-Weld DP-420 Epoxy Adhesive" is spread onto the toluene-treated surface and up to the edge of the extended protective tape. A 5/16 inch (8.5 mm) width threaded area steel Tee Nut having 7/8 inch (23 mm) base and a 5/8 inch (15 mm) height is positioned onto the liquid epoxy resin such that the edge of the Tee Nut is positioned less than 1/16 inch (3 mm) from the edge of the bonded DVD edge. 5–10 ml of liquid epoxy is then added to cover the flange of the Tee Nut. The assembly is allowed to cure at room temperature for at least about 4 hours. The above-described assembly is then turned over and the entire process is repeated such that the second Tee Nut is mounted as the mirror image of the first Tee Nut. After the final assembly cures for 24 hours, the protective tape is removed.

A 3/8 in.×2 in. socket-capped bolt is then threaded into each of the Tee Nuts. Each Tee Nut is then mounted into one of the clamps of an Instron tester. Using a T-Peel test method, the jaws of the Instron are separated at the rate of 0.1 inch/min., using a 1000 pound load. The force required to rupture the bond, and the distance traveled, are measured.

Crazing Test Method

A 1 cm×4 cm×0.6 mm section of unmetallized or metallized polycarbonate is placed in a glass jar containing the composition to be tested. The polycarbonate is immersed in the composition. After various periods at room temperature (about 70° F.), the appearance of the polycarbonate is visually examined. If there was no change in the polycarbonate after the period of immersion in the composition (i.e., the polycarbonate remained clear), the monomer is deemed to not cause crazing in polycarbonate.

The crazing behavior of a solid monomer is determined by dissolving the solid monomer in a monomer that does not cause crazing in polycarbonate, for example, lauryl acrylate.

Environmental Stability Test Method

A sample is prepared according to the spin coating method or the pressure sensitive adhesive tape method with the exception that the adhesive is in contact with a metal coating on the polycarbonate substrate. The sample is placed in an oven at 78° C. and 100% relative humidity for 16 hours. Upon completion of the aging cycle, the sample is visually examined at test temperature and during and upon cooling to room temperature for haze, bubbles, pinholes, corrosion, and debonding. The sample is recorded as having "good" environmental stability if the above conditions are not visible to the unaided eye, and "fair" environmental stability if some of the above conditions are visible to the unaided eye.

Spin Coating Method

Spin coating of the adhesive to be tested is accomplished using a Model EC101DT-CB15 (Headway Research, Inc.) according to the following method.

About 1.5 ml liquid test adhesive is added to the barrel of a 2 ml glass syringe equipped with a 15 gauge needle to which an 18 in. polyethylene delivery tube is attached. A plunger is inserted in to the syringe and air is displaced from the tube. The loaded syringe is then placed in a syringe pump and locked in place. The syringe pumpis set to deliver a predetermined volume of liquid adhesive over a predetermined time. The spin coater is fitted with a spinning chuch having anchored at its center a tapered aluminum centering pin having a base diameter of about 14 mm. A 120 mm diameter polycarbonate disc (i.e., a DVD half) having a 5 mm diameter center hole is placed on the centering pin. The syringe pump delivery tube is positioned so as to just touch the surface of the disc. The spin coater is turned on and set to 100 rpm (rotations per minute). From about 0.8 ml to about 1.0 ml of adhesive is then dispensed to form a fluid ring centered at about 0.5 in from the center hole of the disc. The spin unit is then decreased to 0 rpm and the adhesive dispensing unit is removed. A second 120 mm diameter polycarbonate disc is then lowered onto the adhesive and held in place until the adhesive has wet the surface of the second disc, and then the second disc is released onto the adhesive. The adhesive is allowed to spread to a point where it fully contacts the disc center hole. Then the spin unit is turned on and ramped from 0 rpm to about 600 rpm in about 3 seconds. The assembly is allowed to spin at 600 rpm for 5 seconds and then ramped to about 1500 rpm over a period of 1 second and held at about 1500 rpm for about 5 seconds to form a film having a thickness of about 1.5 ml. The spin unit is then turned off.

The assembly is then removed from the spin coater, transferred to a covered petri dish and taken to a UV curing unit. The assembly is then subjected to about 1000 mJ/cm$^2$ from a black light curing bulb for no greater than about 10 seconds.

Adhesive Tape Transfer Method

A 120 mm diameter polycarbonate disc (i.e., a DVD half) is placed onto a flat surface and a pressure sensitive adhesive (PSA) transfer tape is applied to the disc by removing a release liner from one side of the tape, securing one end of the exposed surface of the tape to the same flat surface on which the disc was placed, and, while holding the adhesive tape at an angle of at least 15 degrees above the plane of the disc, advancing a 4.5 lb rubber coated roller onto the backside of the tape, forcing the opposite side to contact the disc. Next, the laminated tape is trimmed to the circumference of the disc, the liner is removed, and a second clear polycarbonate disc is carefully lowered onto the freshly exposed adhesive surface and allowed to wet under its own weight for about 30 seconds. The bond is secured by subjecting the disc/adhesive/disc assembly to at least two reciprocating passes of the 4.5 lb roller.

Refractive Index Test Method

The refractive index was measured using an Adobe Refractometer made by Erma Inc., Tokyo, Japan and distributed by Fischer Scientific.

Viscosity Test Method

The viscosity of the composition was determined using a Brookfield Model LV viscometer 60 and No. 4 spindle.

Example Preparation and Results

The example preparations and results of testing are described below.

Example 1

Monomers of isononyl acrylate (INA), 2-ethylhexyl acrylate (2-EHA), lauryl acrylate (LA), isobornl acrylate (IBOA or IBA), isooctyl acrylate (IOA), phenoxyethyl acrylate (PhOEA) were subjected to the Crazing Test Method for periods of 15, 30, 60, 120, and 600 minutes to determine if they cause polycarbonate to craze. The results are reported in Table 1 .

TABLE 1

| Monomer | Presence of Crazing After Period (min) | | | | |
|---|---|---|---|---|---|
| | 15 | 30 | 60 | 120 | 600 |
| INA | NC | NC | NC | NC | NC |
| 2-EHA | NC | NC | NC | NC | sl. hazy |
| LA | NC | NC | NC | NC | NC |
| IBOA or IBA | NC | NC | NC | NC | NC |
| PhOEA | NC | NC | hazy | hazy | opaque |
| LA/NOA/IBOA (60/20/20) | NC | NC | NC | NC | NC |
| IOA | NC | NC | sl. hazy | sl. hazy | sl. hazy |
| INA/NOA (90/10) | NC | NC | NC | NC | NC |
| IBA/NOA (90/10) | NC | NC | NC | NC | NC |

NC = noncrazing
Sl. = slightly

Monomer Synthesis for Examples 2–10

Example 2

Synthesis of $CH_2=CHCONHC(CH_3)_2COOCH_2CH_2-O-C_6H_4-C(CH_3)_2-C_6H_5$ 42.4 g cumylphenol, 18.5 g ethylene carbonate, 20.2 g ethylamine were mixed in a round bottom flask equipped with a magnetic stirring bar and a condenser sealed with a gas evaluation indicator. The reactants were heated to 100° C. whereupon they liquefied and gave off $CO_2$. After 18 hours gas evolution ceased and then layer chromatography (tlc) showed one spot RF 0.39. The composition was concentrated on a rotary evaporator and 100 ml toluene was added to dissolve the liquid residue. The composition was extracted with 100 ml 0.1N NaOH and 100 ml $H_2O$ before drying over $MgSO_4$. The toluene was removed and the resulting liquid was Kugelrohr distilled to provide 46.8 g of a light yellow liquid. The liquid had a refractive index of 1.5761 at 22° C.

23.3 g of 4-cumylphenoxyethanol and 13.9 g of 4,4-dimethyl-2-vinyl-5(4H)oxazolone were mixed to form a light yellow solution. 0.76 g 1,8-diazabicyclo[5.4.0]undec-7-ene (DBU) was added to the composition, which caused warming that was moderated by cooling in an ice water bath. When cool, the yellow glassy solid was dissolved in 25 ml chloroform. A stream of heptane was added with stirring to precipitate a light yellow liquid. The supernatant was decanted, the composition was subjected to rotary evaporation and the oil was dried at less than 1 Torr. White crystals formed slowly. The crystals were filtered, washed with heptane, and dried.

Example 3

Synthesis of $CH_2=CHCONHC(CH_3)_2COOCH_2-O-C_6H_4-C(CH_3)_3$ 105.2 g 4-tert-butylphenol, 132 g ethylene carbonate and 101 g triethylamine were combined and heated at 100° C. for 15 hours. The mixture was then cooled to room temperature. 500 mL ethyl acetate was then added. The solution was extracted with 10% HCl and four 250 mL water washes, dried over magnesium sulfate and filtered. The solvent was removed under reduced pressure leaving 193 g of a brown oil consisting essentially of hydroxyethylated material. The oil was distilled and product was collected at a boiling point of 113–116° C./0.45 mm. 19.4 g of the distilled product, 13.9 g of 2-vinyl-4,4-dimethyl-2(4H)-oxazolin-5-one (VDM) and 4 drops of BDU were mixed together and heated at 80° C. for 15 hours to produce $CH_2=CHCONHC(CH_3)_2COOOCH_2CH_2-O-C_6H_4-C(CH_3)_3$. The compound was recrystallized from aqueous ethanol to produce a white solid having a melting point of 81–83° C.

Example 4

Synthesis of $CH_2=CHCONHCMe_2COOCH_2CH_2-O-C_6H_5$

Synthesis of $CH_2=CHCONHCMe_2COOCH_2CH_2-O-C_6H_5$ was prepared by the reaction of VDM with the corresponding alcohol according to the synthesis of the monomer of Example 2, with the exception that 27.6 g phenoxyethanol was used instead of 42.4 g of cumylphenol.

Example 5

Synthesis of $CH_2=CHCONHCMe_2COOCH_2CH_2-S-C_6H_5$

Synthesis of $CH_2=CHCONHCMe_2COOCH_2CH_2-S-C_6H_5$ was prepared by the reaction of VDM with the corresponding alcohol according to the synthesis of the monomer of Example 2, with the exception that 15.4 g phenylthioethanol was used instead of 4-cumylphenoxyethanol.

Example 6

Synthesis of $CH_2=CHCONHCMe_2COOCH_2CH_2-S-CH_2CH_3$ $CH_2=CHCONHCMe_2COOCH_2CH_2-S-CH_2CH_3$ was prepared by the reaction of VDM with ethylthioethanol according to the synthesis of the monomer of Example 2.

Example 7

Synthesis of 2,6-dibromo-4-nonyl phenyl acrylate 2,6-dibromo-4-nonyl phenyl acrylate was synthesized according to the procedure set forth in Comparative Example 1 of WO/98/50340 entitled, "High Index of Refraction Monomers," which is incorporated herein.

Example 8

Synthesis of 2,6-dibromo-4-dodecyl phenyl acrylate 2,6-dibromo-4-dodecyl phenly acrylate was synthesized according to the procedure set forth in Comparative Example 3 of WO/98/50340 entitled. "High Index of Refraction Monomers."

Example 9

Synthesis of 4,6-dibromo-2-dodecyl-phenyl acrylate 4,6-dibromo-2-dodecylphenyl acrylate was synthesized according to set forth in Comparative Example 2 of WO/98/50340 entitled, "High Index of Refraction Monomers."

Example 10

Synthesis of 4,6-dibromo-2-secbutyl-phenyl acrylate 4,6-dibromo-2-secbutyl-phenyl acrylate was synthesized according to set forth in Example 1 of WO/98/50340 entitled, "High Index of Refraction Monomers."

The monomers of Examples 2–10 were tested according to the Refractive Index (R.I.) and Crazing Test Methods. The results are reported in Table 2.

TABLE 2

| Monomer | R. I | Presence of Crazing After Period of Contact | | | | |
|---|---|---|---|---|---|---|
| | | 30 min | 60 min | 4 hr | 24 hr | 100 hr |
| Lauryl acrylate | 1.4426 | NC | NC | NC | NC | NC |
| Example 2+ | NT | NC | NC | NC | NC | NC |
| Example 3+ | NT | NC | NC | NC | NC | NC |
| Example 4+ | NT | NC | NC | C | C | C |
| Example 5+ | NT | NC | NC | C | C | C |
| Example 6 | 1.5002 | NC | NC | NC | NC | NC |
| Example 7 | 1.5425 | NC | NC | NC | NC | NC |
| Example 8 | 1.5330 | NC | NC | NC | NC | NC |
| Example 10 | 1.5620 | NC | NC | NC | NC | NC |

+= These monomers were solid at room temperature and were dissolved in lauryl acrylate for the crazing test.
NT = not tested
NC = non-crazing
C = crazing Homopolymer Synthesis Homopolymer of the monomers of Examples 2–10 were synthesized as follows.

Example 11

Synthesis of poly $CH_2=CHCONHC(CH_3)_2COOCH_2CH_2-O-C_6H_4-C(CH_3)_2-C_6H_5$

5g $CH_2=CHCONHC(CH_3)_2COOCH_2CH_2-O-C_6H_4-C(CH_3)_2-C_6H_5$ monomer was placed in a glass bottle. 0.01 grams of 2,21-azobis(isobutyronitrile) free radical initiator and 10 grams of ethyl acetate were added to the monomer. The reaction bottle was purged with nitrogen and sealed. The reaction bottle was placed in a 60° C. bath and tumbled for 24 hours to produce a polymer having a glass transition temperature of 51° C.

Example 12

Poly$CH_2=CHCONHC(CH_3)_2COOCH_2CH_2-O-C_6H_4-C(CH_3)_3$ was synthesized according to the method of Example 11 with the exception that the monomer was $CH_2=CHCONHC(CH_3)_2COOCH_2CH_2-O-C_6H_4-C(CH_3)_3$.

Example 13

Poly$CH_2=CHCONHC(CH_3)_2COOCH_2CH_2-O-C_6H_5$ was synthesized according to the method of Example 11 with the exception that the monomer was $CH_2=CHCONHCMe_2COOCH_2CH_2-O-C_6H_5$.

Example 14

Poly $CH_2=CHCONHC(CH_3)_2COOCH_2CH_2-S-C_6H_5$ was synthesized according to the method of Example 11 with the exception that the monomer was $CH_2=CHCONHCMe_2COOCH_2CH_2-S-C_6H_5$.

Example 15

Poly$CH_2=CHCONHC(CH_3)_2COOCH_2CH_2-S-CH_2CH_3$ was synthesized according to the method of Example 11 with the exception that the monomer was $CH_2=CHCONHCMe_2COOCH_2CH_2-S-CH_2CH_3$. The resulting polymer had a glass transition temperature of 39° C. to 45° C.

Example 16

Poly 2,6-dibromo-4-nonylphenyl acrylate was synthesized according to the method of Example 11 with the exception that the monomer was 2,6-dibromo-4-nonylphenyl acrylate and the bottle was tumbled for 48 hours to produce a polymer. The glass transition temperature of the polymer was 46° C.

Example 17

Poly 2,6-dibromo-4-dodecylphenyl acrylate was synthesized according to the method of Example 16, with the exception that the monomer was 2,6-dibromo-4-dodecylphenyl acrylate. The glass transition temperature of the polymer was 5° C.

Example 18

Poly 4,6-dibromo-2-dodecylphenyl acrylate was synthesized according to the method of Example 11 with the exception that the monomer was 4,6-dibromo-2-dodecylphenyl acrylate monomer and the bottle was tumbled for 100 hours to produce a polymer.

Example 19

Poly 4,6-dibromo-3-secbutyl-phenyl acrylate was synthesized according to the method of Example 11 with the exception that the monomer was 4,6-dibromo-2-secbutyl-phenyl acrylate and the bottle was tumbled for 100 hours to produce a polymer. The glass transition temperature of the polymer was 67° C.

Synthesis of High Refractive Index Copolymers

Example 20

Synthesis of lauryl acrylate-$CH_2=CHCONHC(CH_3)_2COOCH_2CH_2-O-C_6H_4-C(CH_3)_2-C_6H_5$ (50/50) copolymer: 2.5 g $CH_2=CHCONHC(CH_3)_2COOCH_2CH_2-O-C_6H_4-C(CH_3)_2-C_6H_5$ (the monomer of Example 6), 2.5 g lauryl acrylate, 0.16% Irgacure 651 (based on the total monomers mixture) and 5 g methylethyl ketone were combined in a glass bottle. The solution was inverted and exposed to black light for about 30 min to form the copolymer. At the end of the reaction, the viscous solution was purified by precipitation from the methanol and vacuum dried to constant weight.

Examples 21–42

Additional copolymers of lauryl acrylate and the monomers of Examples 2–10, were synthesized as described above in Example 20 with the exception that each component was added in the amount indicated in Table 3A. The compositions were subjected to the Crazing Test Method and Refractive Index Test Method. The results are set forth in Table 3A.

TABLE 3A

| Example | Co-monomer | Amount of Co-monomer (g) | Amount of Lauryl Acrylate (g) | Refractive Index | Crazing after 30 min at Room Temp. |
|---|---|---|---|---|---|
| 20 | Example 2 | 2.5 | 2.5 | 1.5260 | NC |
| 21 | Example 2 | 4.0 | 1.0 | 1.5450 | NC |
| 22 | Example 11 | 5.0 | 0.0 | 1.5640 | NC |
| 23 | Example 3 | 2.5 | 2.5 | 1.4983 | NC |
| 24 | Example 3 | 1.0 | 4.0 | 1.5193 | NC |
| 25 | Example 12 | 5.0 | 0.0 | 1.5325 | NC |
| 26 | Example 4 | 2.5 | 2.5 | 1.5015 | NC |
| 27 | Example 4 | 4.0 | 1.0 | 1.5275 | NC |
| 28 | Example 13 | 5.0 | 0.0 | 1.5440 | NC |

TABLE 3A-continued

| Example | Co-monomer | Amount of Co-monomer (g) | Amount of Lauryl Acrylate (g) | Refractive Index | Crazing after 30 min at Room Temp. |
|---|---|---|---|---|---|
| 29 | Example 5 | 2.5 | 2.5 | 1.5155 | NC |
| 30 | Example 5 | 4.0 | 1.0 | 1.5475 | NC |
| 31 | Example 14 | 5.0 | 0.0 | 1.5750 | NC |
| 32 | Example 6 | 4.0 | 1.0 | 1.5110 | NC |
| 33 | Example 15 | 5.0 | 0.0 | 1.5260 | NC |
| 34 | Example 7 | 2.5 | 2.5 | 1.5075 | NC |
| 35 | Example 7 | 4.0 | 1.0 | 1.5370 | NC |
| 36 | Example 16 | 5.0 | 0.0 | 1.5645 | NC |
| 37 | Example 8 | 2.5 | 2.5 | 1.5129 | NC |
| 38 | Example 8 | 4.0 | 1.0 | 1.5341 | NC |
| 29 | Example 17 | 5.0 | 0.0 | 1.5469 | NC |
| 40 | Example 10 | 2.5 | 2.5 | 1.5175 | NC |
| 41 | Example 10 | 4.0 | 1.0 | 1.5635 | NC |
| 42 | Example 19 | 5.0 | 0.0 | 1.5880 | NC |

NC = non-crazing

Examples 20A, 23A, 26A

The polymers of Examples 20, 23 and 26 were then coated on silicone-treated PET release liners and the solvent was evaporated to form pressure sensitive adhesive tape.

Example 32A 2.5 g $CH_2=CHCONHCMe_2COOCH_2CH_2-S-C_6H_5$ (the monomer of Example 5), 2.5 g lauryl acrylate, 0.1% by weight HDDA were combined in a glass bottle. The solution was inverted and exposed to black light for about 30 min to form the copolymer. At the end of the reaction, the viscous solution was purified by precipitation from methanol and vacuum dried to constant weight.

Example 34A

A syrup was prepared according to the method described in Example 32A with the exception that 2.5 g $CH_2=CHCONHC(CH_3)_2COOCH_2CH_2-O-C_6H_4-C(CH_3)_2-C_6H_5$ (the monomer of Example 6), was used instead of the monomer of Example 5.

Each syrup of Examples 32A and 34A was coated between two silicone-treated PET release liners in a nitrogen rich environment using a knife-over bed method and a coating gap of 2.0 mils. The coated syrup was exposed to UV radiation in a cure chamber where the syrup was first exposed to black lights set to 1.0 mW/cm², and then to black lights set to 2.2 mW/cm² in the remainder of the cure chamber to form a pressure sensitive adhesive tape. a total of 250 mJ/sq. cm of energy was used.

The pressure sensitive adhesive tapes of Examples 20A, 23A, 26A, 32A and 34A were then prepared according to the Adhesive Tape Transfer Method and subjected to the Clevage Strength Test Method and the Environmental Stability Test Method. The results are reported in Table 3B.

TABLE 3B

| Example | Co-monomer | Amount of Co-monomer (g) | Amount of Lauryl Acrylate (g) | Cleavage Strength (lbs) | Environmental Stability |
|---|---|---|---|---|---|
| 20A | Example 2 | 2.5 | 2.5 | 89 | good |
| 23A | Example 3 | 2.5 | 2.5 | 109 | good |
| 26A | Example 4 | 2.5 | 2.5 | 112 | fair |
| 32A | Example 5 | 2.5 | 2.5 | 92 | fair |
| 34A | Example 6 | 2.5 | 2.5 | 126 | good |

Spin Coatable Adhesive Preparation

Spin coatable compositions were prepared as follows.

Examples 43–47

Lauryl acrylate (LA), isobornyl acrylate (IBA) and 2,2-dimethoxy-2-phenyl acetophenone (KB-1) and, where indicated, carbon tetrabromide, were added to a 16 ounce jar and stirred. The mixture was purged with nitrogen and then exposed to ultraviolet light until a coatable viscosity was obtained. Next, N-octyl acrylamide (NOA) was dissolved in the thickened mixture. For those compositions that included a crosslinking agent, either 1,6-hexanediol diacrylate (HDDA) or 1,2-dodecyl diacrylate (DODA) the crosslinking agent was then added to the thickened mixture with stirring.

Additional KB-1, in an amount sufficient to achieve a 0.5 to 1.0% by weight KB-1 loading level, was then added to the mixture and dissolved into the syrup.

The amounts of LA, IBA, NOA, KB-1, and crosslinking agent, the viscosity, and the results when subjected to the Crazing Test Method of the compositions of Examples 43–47 are reported in Table 4.

Articles were then prepared according to the Spin Coating Method and subjected to the Cleavage Test Method. The results are reported in Table 4.

TABLE 4

| Component | Ex. 43 | Ex. 44 | Ex. 45 | Ex. 46 | Ex. 47* |
|---|---|---|---|---|---|
| LA | 46 | 34 | 34 | 34 | 31.5 |
| IBA | 27 | 46 | 46 | 46 | 42.9 |
| NOA | 27 | 20 | 20 | 20 | 25.6 |
| HDDA | — | 0.05 | 0.1 | — | — |
| DODA | — | — | — | 0.75 | — |
| KB-1 | 1 | 0.5 | 0.5 | 0.5 | 0.5 |
| Viscosity (cps) | 200 | 430 | 430 | 430 | 200 |
| Presence of Crazing** | NC | NC | NC | NC | NC |
| Cleavage Strength (lbs) | 71 | 90 | 111 | 170 | 482 |

*= 0.5 parts by weight carbon tetrabromide
**= determined after 30 min at room temperature
NC = non-crazing Synthesis of Low Refractive Index Copolymers (P-1 to P-5): Preparation of copolymer P-1 (LA/IBA/NOA 46/27/27) 46 g LA, 27 g IBA, 27 g NOA, 0.2 g AIBN, 5 g isopropyl alcohol, and 95 ethyl acetate were placed in a glass bottle. The bottle was purged with nitrogen and sealed. The bottle was then placed in a 60° C. bath and tumbled for 24 hours to produce a copolymer. The copolymer was purified by precipitation from methanol and dried to a constant weight in vacuum. The number average molecular weight of the copolymer was about 200,000 as determined by gel permeation chromatography. The copolymer was designated as P-1.

Preparation of copolymer P-2 (LA/IBA/NOA 46/27/27)

The above procedure used to prepare copolymer P-1 was repeated with the exception that 0.5% by weight carbon tetrabromide chain transfer agent was used in place of isopropanol. The copolymer was designated as P-2. The number average molecular weight of P-2 was 102,000.

Preparation of copolymer P-3 (LA/IBA/NOA 46/27/27)

The above procedure used to prepare P-1 was repeated with the exception that 1.0% by weight carbon tetrabromide chain transfer agent was used in place of isopropanol. The copolymer was designated P-3. The number average molecular weight of P-3 was 54,000.

Preparation of reactive copolymer P-4 (LA/IBA/NOA 46/27/27) 46 g LA, 27 g IBA, 27 g NOA, 0.5 g photoinitiator containing monomer described in Example 1, U.S. Pat. No. 5,506.279, an alpha cleavage type polymerizable photoinitiator, 0.2 g AIBN, 10 g isopropyl alcohol, and 90 g ethyl acetate were placed in a glass bottle. The reaction bottle was purged with nitrogen and sealed. The reaction bottle was placed in a 60° C. bath and tumbled therein for 24 hours to produce a copolymer. The copolymer was purified by precipitation from methanol and dried to a constant weight in vacuum. The number average molecular weight of the polymer was about 189,000.

Preparation of reactive copolymer P-5 (LA/IBA/NOA 46/27/27) 46 g IOA, 27 g IBA, 27 g NOA, 0.2 g AIBN, 5 isopropyl alcohol, and 95 g ethyl acetate were placed in a glass bottle. The bottle was purged with nitrogen and sealed. The bottle was placed in a 60° C. bath and tumbled therein for 24 hours to produce a copolymer. The copolymer was purified by precipitation from methanol and dried to a constant weight in vacuum. The number average molecular weight of the copolymer was about 180,000 and was designated as P-5.

Preparation of reactive copolymer P-6 (IOA/IBA/NOA 46/27/27) 46 g LA, 27 g IBA, 27 g NOA, 0.5 g PIA (photoinitiator containing monomer described in Example 1, of U.S. Pat. No. 5,506,279), 0.2 g AIBN, 10 g isopropyl alcohol and 90 g ethyl acetate were placed in a glass bottle. The bottle was purged with nitrogen and sealed. The bottle was placed in a 60° C. bath and tumbled therein for 24 hours to produce a copolymer. The copolymer was purified by precipitation from methanol and dried to a constant weight in vacuum. The number average molecular weight of the copolymer was about 160,000 and was designated as P-6.

Examples 48–53

The compositions of Examples 48–53 were prepared as follows.

Monomers, and the copolymers P-1-P-6 were combined in a 16 ounce jar in the amounts indicated in Table 5 and stirred. An amount of KB-1 sufficient to achieve a 0.5 to 1.0% by weight loading level was added to the syrup and dissolved into the syrup. Additionally, photoinitiator containing monomer described in Example 1 of U.S. Pat. No. 5,506,279, was added to Examples 51 and 53 in the amount indicated.

The viscosity of the compositions of Examples 48–53 are reported in Table 5.

Articles were then prepared according to the Spin Coating Method and subjected to the Cleavage Test Method. The results are reported in Table 5.

TABLE 5

| Components | Ex. 48 | Ex. 49 | Ex. 50 | Ex. 51 | Ex. 52 | Ex. 53 |
|---|---|---|---|---|---|---|
| LA | 43.7 | 41.4 | 41.4 | 29.9 | 41.4 | 41.4 |
| IBA | 25.7 | 24.3 | 24.3 | 40.5 | 24.3 | 24.3 |
| NOA | 25.6 | 24.3 | 24.3 | 24.3 | 24.3 | 24.3 |
| P-1 LA/IBA/NOA | 5 | — | — | — | — | — |
| P-2 LA/IBA/NOA | — | 10 | — | — | — | — |
| P-3 LA/IBA/NOA | — | — | 10 | — | — | — |
| P-4 LA/IBA/NOA | — | — | — | 5 | — | — |
| P-5 IOA/IBA/NOA | — | — | — | — | 10 | — |
| P-6 IOA/IBA/NOA | — | — | — | — | — | 10 |
| PIA | — | — | — | 0.48 | — | 0.45 |
| KB-1 | 0.5 | 0.5 | 0.5 | 0.1 | 0.5 | 0.1 |
| Results |  |  |  |  |  |  |
| Viscosity (cPs) | 289 | 226 | 125 | 102 | 250 | 230 |
| Presence of Crazing | NC | NC | NC | NC | NC | NC |
| Environmental Stability | good | fair | NT | NT | NT | good |
| Cleavage strength (lbs) | 289 | 226 | NT | 401 | 65 | 250 |

NT = not tested
NC = not crazing

Pressure Sensitive Adhesive Transfer Tape Preparation:

Examples 54–59

Pressure sensitive adhesive transfer tapes were prepared as follows.

Monomers and KB-1 were added to a 16 ounce jar in the amounts set forth in Tables 6. Additionally, 0.5 parts by weight PIA (photoinitiator containing monomer described in Example 1 of US. Pat. No. 5,506,279) was added to Example 58. The mixture was purged with nitrogen and then exposed to ultraviolet light until a coatable viscosity was obtained. When present, HDDA crosslinking agent was added to the thickened mixture with stirring. An amount of KB-1 sufficient to achieve a 0.2% by weight loading level was added to form a syrup.

The syrup was coated between two silicone-treated polyethylene phthalate (PET) release liners in a nitrogen rich environment using a knife-over bed method and a coating gap of 2.0 mils. The coated syrup was exposed to UV radiation in a cure chamber where the syrup was first exposed to black lights set to 1.0 mW/cm$^2$, and then to black lights set to 2.2 mW/cm$^2$ in the remainder of the cure chamber. A total of 250 mJ/sq. cm of energy was used. Cure residence time was 145 seconds.

The components and the amount of each component for the compositions of Examples 60–65 are reported in Table 6.

TABLE 6

| Components | Ex. 54 | Ex. 55 | Ex. 56 | Ex. 57 | Ex. 58 | Ex. 59 |
|---|---|---|---|---|---|---|
| LA | 50.5 | 50.5 | 45.5 | 45.5 | 45.5 | 50 |
| IBA | 29.7 | 29.7 | 34.7 | 34.7 | 34.7 | — |
| NOA | 19.8 | 19.8 | 19.8 | 19.8 | 19.8 | — |
| Monomer of Example 2 | — | — | — | — | — | 50 |
| HDDA | — | 0.1 | — | 0.1 | 0.1 | — |

TABLE 6-continued

| Components | Ex. 54 | Ex. 55 | Ex. 56 | Ex. 57 | Ex. 58 | Ex. 59 |
|---|---|---|---|---|---|---|
| KB-1 | 0.2 | 0.2 | 0.2 | 0.2 | 0.2 | 0.2 |
| Results | | | | | | |
| Presence of Crazing | NC | NC | NC | NC | NC | NC |
| Environmental Stability | good | fair | NT | NT | fair | good |
| Cleavage Strength (lbs) | 165 | 157 | 175 | 168 | 175 | 89 |

NT = not tested
NC = non-crazing

Polymer Addition Adhesive Preparation

Example 60

10 parts by weight Example 16 polymer was dissolved in a monomer mixture containing 45 parts by weight monomer of Example 7 and 45 parts lauryl acrylate. An amount of KB-1 photoinitiator was added to the composition to provide a composition having a viscosity of 225 cPs.

The composition was then applied to a polycarbonate substrate and formed into a bonded article according to the Spin Coating Method. The resulting article was found to have a cleavage strength of 184 lbs.

Sol Preparation:

Example 61

99.96 g Nalco 2327 (41.5% by weight $SiO_2$) (Nalco, Chemical, Ill.) was added to a 1000 ml round bottom flask. 45 g of 2-methoxypropoanol was added to the flask in 10 ml aliquots while swirling to produce a clear blue solution. 3.84 g octytrimethoxysilane, 3.99 g 3-methacryloloxypropyltrimethoxysilane, and 75 g 2-methoxypropoanol were then added to the flask and mixed to produce a clear blue solution. The flask was then placed on a rotary evaporator and allowed to react at 90° C. for 80 minutes (without vacuum) during which time the particles precipitated out.

29 g lauryl acrylate/isobornyl acrylate (LA/IBA) having a monomer ratio of 42.3/57.6 was then added to the flask. The alcohol and water is removed from the composition using 50 mbar of pressure at 70° C. Residual water and alcohol was then removed and the resultant sol was clear and non-viscous. The silica content was measured by TGA to be 55.02% by weight.

The sol was then diluted with N-octyl acrylamide (NOA) to obtain the following composition:, $SiO_2$/LA/IBA/NOA 47.65/16.48/22.44/13.4.

Example 62

A sol was prepared using 50 g Nalco 2327, 60 g 2-methoxypropoanol, 2.88 g octytrimethoxysilane, 0.57 g mercaptopropyltrimethoxysilane, and 25 g lauryl acrylate/isobornylacrylate (LA/IBA 42.3/57.66) according to the procedure of Example 61 with the exception that the silanization was run at 90° C. for 30 min.

The sol was then diluted with N-octyl acrylamide (NOA) to obtain the following composition: $SiO_2$/LA/IBA/NOA 37.0/19.83/27.00/16,13.

Spin coatable adhesive compositions were prepared using the sols of Examples 61–62 by diluting the sols to 5, 10 and 20% by volume in an adhesive syrup of LA/IBA/NOA (31.5/42.8125.6) according to the formulations in Table 7.

The compositions of Examples 61–62 were then prepared according to the Spin Coating Method and subjected to the Cleavage Strength Test Method. The results are reported in Table 7.

TABLE 7

| Example | % by volume Sol | Viscosity (cPs) | Cleavage Strength (lbs) |
|---|---|---|---|
| 61 | 20 | 240 | 185 |
| 61 | 10 | 60 | 368 |
| 61 | 10 | 138 | 222 |
| 61 | 5 | 204 | 168 |
| 62 | 20 | 72 | 232 |
| 62 | 10 | 846 | 268 |
| 62 | 10 | 120 | 169 |
| 62 | 5 | 372 | 201 |

Pressure Sensitive Adhesive Transfer Tape Preparation (w/Sols):

Example 63

A sol was prepared using 50.13 g Nalco 2327, 45 g 2-methoxypropoanol, 1.6 g octytrimethoxysilane, 1.58 g 3-mercaptopropyltrimethoxysilane, and 25 g lauryl acrylate/isobornylacrylate (LA/IBA 56.8/43.2) according to the procedure of Example 70 with the exception that the silanization was run at 90° C. for 27 min.

The sol was then diluted with N-octyl acrylamide (NOA) to obtain the following composition: $SiO_2$/LA/IBA/NOA (38.06/28.16/21.42/12.37).

Example 64

A sol was prepared using 50.10 g Nalco 2327, 50 g 2-methoxypropanol, 1.6 g octytrimethoxysilane, 2.02 g 3-methacryloyloxypropyltrimethoxysilane, and 25 g lauryl acrylate/isobornylacrylate (LA/IBA 56.8/43.2) according to the procedure of Example 70 with the exception that the silanization was run at 90° C. for 30 min.

The sol was then diluted with N-octyl acrylamide (NOA) to obtain the following composition: $SiO_2$/LA/IBA/NOA (38.65/27.88/21.21/12.27).

Pressure sensitive adhesive compositions were prepared using the sols of Examples 63–64 by diluting the sols to 2, 5 and 10% by volume in a pressure sensitive adhesive syrup of LA/IBA/NOA (31.5/42.8/25.6) according to the formulations in Table 8. The compositions were then prepared according to the Adhesive Tape Transfer Method and subjected to the Cleavage Strength Test Method. The results are reported in Table 8.

TABLE 8

| Example | % by Volume Sol | Cleavage Strength (lbs) |
|---|---|---|
| 63 | 10 | 137 |
| 63 | 5 | 158 |
| 63 | 2 | 144 |
| 64 | 10 | 94 |
| 64 | 5 | 141 |
| 64 | 2 | 172 |

Example 65

Titanium Dioxide Sol

Nanocrystalline titanium dioxide particles were prepared according to the procedures described in PCT Application Serial No. U.S.9815843, entitled, "Nanosize Metal Oxide Particles for Producing Transparent Metal Oxide Colloids and Ceramers," (Amey et al.) filed Jul. 30, 1998, which is incorporated herein.

32.9 g of the titanium dioxide particles were mixed with stirring to 800 mL 2-butanone to provide a white slurry. A mixture of 9.62 g 3-methacrylolyoxypropyl trimethoxysilane, 1.95 g 3-glycidoxypropyl trimethoxysilane, and 3.1 g octadecyl trimethoxysilane was added to the slurry. The mixture was heated to 68° C. for 5 hours while stirring. A mixture of 4.62 g water, 10 drops of concentrated NH$_4$OH, and 60 ml 2-butanone was added drop wise to the solution as it was being stirred. The temperature of the composition was then reduced to 45° C. and stirred for 12 hours.

The transparent colloid was concentrated on a rotary evaporator under vacuum at 30 C until the 2-butanone ceased to distill to form a slightly opaque syrup. Approximately 300 mL heptane was added to the syrup and the resulting mixture stirred 1 hour following the immediate precipitation of weakly flocked particles. The slurry was transferred to centrifuge bottles and centrifuged at 2500 rpm for 10 minutes followed by decanting the supernate. Further purification of the particles was accomplished by resuspending the particle in fresh portions of heptane and centrifuging the slurry for 10 minutes followed by decantation of the heptane. The particles were then redispersed into 2-butanone to produce a 6.6% by weight solids sol.

140 g of the sol was then combined with 21.56 g of a monomer mixture of IBA/LA/NOA (43.02/31.47/25.51), 0.25 Irgacure 4265 photoinitiator. The 2-butanone was then removed by rotary evaporation. The composition exhibited a refractive index of 1.5405.

Examples 65–67

A zirconia sol was prepared by combining 90.49 g ZrO$_2$ sol (33% by weight solids) as described in U.S. Pat. No. 5,037,579, 4.27 g oleic Acid, 1.49 g acrylic acid, 22.67 LA/IBA/NOA (31.5/42.9/25.6) syrup, and 188.35 g Methoxy-2-propanol and shaking, which resulted in a white precipitate. The water and alcohol were stripped off on a rotovap at 65° C. The final product was a blue/white tinted fluid sol that included 42.57% by weight ZrO$_2$ and had a refractive index of 1.5385. The refractive index of the monomers without ZrO$_2$ was 1.464.

The zirconia sol was then diluted in a LA/IBA/NOA (31.5/42.9/25.6) syrup according to the formulations in Table 9. The viscosity of the compositions was determined. The compositions were then prepared according to the Spin Coating Method and subjected to the Cleavage Strength Test Method. The results are reported in Table 9.

TABLE 9

| Example | Zr Sol (g) | LA/IBA/NOA (g) | Viscosity (cPs) | Cleavage Strength (lbs) |
|---------|------------|----------------|-----------------|-------------------------|
| 65 | 46.98 | 53.02 | 220 | 346 |
| 66 | 23.49 | 75.61 | 320 | 460 |
| 67 | 11.75 | 88.25 | 350 | 394 |

Example 68

A zirconia sol was prepared according to the method of Example 65, using 9.0 g IOA, 75 g methoxypropanol, 1.84 g oleic acid, 0.64 g acrylic acid and 36 g ZrO$_2$ sol (33% by weight solids) as described in U.S. Pat. No. 5,037,579. The resulting composition had a refractive index of 1.5415. The refractive index of the monomers without the ZrO$_2$ was 1.436.

Example 69

1.586 g of nonylphenyl acrylate/3-acryoxypropyl 2-n-phenylcarbamate (50/50) was combined with 12.5 g methoxypropanol, 0.182 g MPA, 0.107 g acrylic acid and 6 g ZrO$_2$ sol (33% by weight solids) as described in U.S. Pat. No. 5,037,579, according to the preparation described in Example 68. The resulting composition had a refractive index of 1.565. The refractive index of the monomers without the ZrO$_2$ was 1.513.

Other embodiments are within the following claims.
What is claimed is:
1. A composition comprising:
a) a first monomer having the formula CH$_2$=CHCOOR$^1$, where R$^1$ is a linear alkyl group having from 9 to 16 carbon atoms or a branched alkyl group having from 9 to 30 carbon atoms, and whose homopolymer has a T$_g$ less than 0° C.;
b) a second monomer having the formula CH$_2$=CHCOOR$^2$, where R$^2$ is an alkyl group having at least 9 carbon atoms whose homopolymer has T$_g$ greater than 15° C.; and
c) a component comprising any of:
   i) a monomer having the formula CH$_2$CHCONHCR$^5$R$^6$COWP, where R and R$^6$ are alkyl groups having from 1 to 14 carbon atoms, cycloalkyl groups having from 3 to 14 carbon atoms, aryl groups having from 5 to 12 carbon atoms, an arene group having from 6 to 16 carbon atoms and no greater than 3 atoms selected from the group consisting of S, N, and non-peroxide O, or where R$^5$ and R$^6$ when taken together with the carbon atoms to which they are connected form a carboxylic ring having 4 to 12 carbon atoms, W is O, NH, or a divalent connecting group, and P is ArR$^7$, where Ar is an styrene group and R$^7$ is a linear or branched alkyl or alkoxy group, an aryl group, or an alkarylene group such that the total number of carbon atoms in ArR$^7$ is at least 10, or

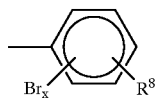

where x is from 1 to 4, and R$^8$ is a linear or branched alkyl group having at least 4 carbon atoms;
   ii) a monomer having the formula:

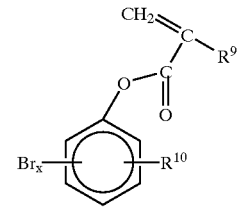

where R$^9$ is H or CH$_3$, x is from 1 to 4, and R$^{10}$ is a linear or branched alkyl group having at least 4 carbon atoms;
   iii) a monomer having the formula CH$_2$=CHCOO (R$^{11}$)$_n$OCOCH=CH$_2$, where R$^{11}$ is a linear or branched alkylene and n is at least 6;

iv) a polymer having a molecular weight greater than about 1500 and being soluble in at least one of said first monomer and said second monomer;
v) surface-modified particles, or
vi) combinations thereof.

2. The composition of claim 1, wherein when said composition does not cause crazing in polycarbonate when in contact with the polycarbonate for a period of about 30 minutes at 25° C.

3. The composition of claim 1, wherein said composition has a refractive index of at least about 1.49.

4. The composition of claim 1, wherein said composition has a refractive index of at least about 1.5.

5. The composition of claim 1, wherein said composition has a viscosity of at least about 50 cPs at 25° C.

6. The composition of claim 1, wherein said composition exhibits a cleavage strength to polycarbonate of at least about 50 lbs.

7. The composition of claim 1, wherein the second monomer comprises a bicyclic hydrocarbon or a tricyclic hydrocarbon.

8. The composition of claim 1, wherein said first monomer comprises lauryl acrylate, isononyl acrylate, decyl acrylate, isodecyl acrylate, tetradecyl acrylate, or combinations thereof.

9. The composition of claim 1, wherein said second, monomer comprises isobornyl acrylate, dicyclopentadienyl acrylate, or combinations thereof.

10. The composition of claim 1, wherein said component comprises said monomer i).

11. The composition of claim 10, wherein said monomer i) comprises: $CH_2=CHCONHC(CH_3)_2COOCH_2CH_2—O—C_6H_4—C(CH_3)_2—C_6H_5$, $CH_2=CHCONHC(CH_3)_2COOCH_2CH_2—O—C_6H_4—C(CH_3)_3$, $CH_2=CHCONHC(CH_3)(C_2H_5)COOCH_2CH_2—O—C_6H_4—C(CH_3)_2—C_6H_5$, $CH_2=CHCONHC(CH_3)(pH)COOCH_2CH_2—O—C_6H_4—C(CH_3)_2—C_6H_5$, $CH_2=CHCONHC(CH_3)(C_6H_4)COOCH_2CH2—O—C_6H_4—C_5H_{11}$, $CH_2=CHCONHC(CH_3)_2COOCH_2CH_2—O—C_6H_4—CO_8H_{17}$, $CH_2=CHCONHC(CH_3)_2COOCH_2CH_2—O—C_6H_4—C_9H_{19}$, $CH_2=CHCONHC(CH_3)_2COOCH_2CH_2—O—C_6H_4—C_{12}H_{25}$, $CH_2=CHCONHC(CH_3)_2COOCH_2CH_2—O—C_6H_3(CH_3)C_3H_7$, $CH_2=CHCONHC(CH_3)_2COOCH_2CH_2—O—C_6H_3(Br)C_4H_9$, $CH_2=CHCONHC(CH_3)_2COOCH_2CH_2—O—C_6H_3(Br)C_{12}H_{25}$, $CH_2=CHCONHC(CH_3)_2COOCH_2CH_2—O—C_6H_2(Br)_2C_4H_9$, or combinations thereof.

12. The composition of claim 10, wherein said component comprises said monomer ii).

13. The composition of claim 1, wherein said component comprises said monomer iii).

14. The composition of claim 13 wherein said monomer iii) comprises 1,6-hexanediol diacrylate, 1,8-octanediol diacrylate, 1,10-decanediol diacrylate, 1,12-dodecanediol diacrylate, or combinations thereof.

15. The composition of claim 1, wherein said component comprises said polymer.

16. The composition of claim 15, wherein said polymer comprises functional groups capable of associating with at least one of said first monomer and said second monomer.

17. The composition of claim 15, wherein said polymer has a refractive index that differs from the refractive index of a mixture consisting of said first monomer and said second monomer.

18. The composition of claim 1 wherein said component comprises said surface-modified particles.

19. The composition of claim 18 wherein said surface-modified particles comprises surface-modified zirconia, titania, silica, and ceria particles, or combinations thereof.

20. The composition of claim 18, wherein said surface-modified particles include surface groups comprising carboxylic acids, sulfonic acids, phosphonic acids, phosphates, silanes, or combinations thereof.

21. The composition of claim 18, wherein said surface-modified particles include surface groups capable of associating with at least one of said first monomer and said second monomer.

22. The composition of claim 1, comprising
from about 20 to about 80 parts by weight of said first monomer, and
from about 5 to about 40 parts by weight of said second monomer.

23. The composition of claim 22, wherein said component comprises no greater than about 40 parts by weight of said monomer i).

24. The composition of claim 22, wherein said component comprises no greater than about 50 parts by weight of said monomer ii).

25. The composition of claim 22, wherein said component comprises no greater than about 5 parts by weight of said monomer iii).

26. The composition of claim 22, wherein said component comprises said polymer.

27. The composition of claim 26, wherein said polymer comprises functional groups capable of associating with at least one of said first monomer or said second monomer.

28. The composition of claim 22, wherein said component comprises surface-modified particles.

29. The composition of claim 28, wherein said particles comprise surface groups capable of associating with at least one of said first monomer or said second monomer.

30. The composition of claim 28, wherein said particles have a refractive index that differs from the refractive index of a mixture consisting of said first monomer and said second monomer.

31. The composition of claim 22, wherein said composition has a refractive index of at least about 1.49.

32. A composition comprising the reaction product of a reaction mixture comprising
a) the composition of claim 1;
b) a crosslinking agent; and
c) a photoinitiator.

33. A composition according to claim 32, wherein the composition is in the form of an adhesive.

34. A composition according to claim 32, wherein the composition is in the form of a pressure sensitive adhesive.

35. An article comprising:
a polycarbonate substrate; and
the composition of claim 32 on said substrate.

36. The article of claim 35 further comprising a second polycarbonate substrate, said composition being disposed between said first polycarbonate substrate and said second polycarbonate substrate.

37. The article according to claim 35, wherein said article is in the form of an optical recording medium.

38. A composition comprising:
a) a monomer comprising any of
i) a first monomer having the formula $CH_2=CHCOOR^1$, where $R^1$ is a linear alkyl group having from 9 to 16 carbon atoms or a branched alkyl group having from 9 to 30 carbon atoms, and whose homopolymer has a Tg less than 0° C.;
ii) a second monomer having the formula $CH2=CHCOOR^2$, where $R^2$ is an alkyl group having at least 9 carbon atoms whose homopolymer has a Tg greater than 15° C.; or iii) combinations thereof, and
b) crystalline zirconia particles having an average particle size no greater than about 20 nm and having a dispersion index ranging from about 1–3, said particles having a crystallinity index of at least about 0.65 and at least about 70% combined cubic and tetragonal crystal lattice structure in the absence of a cubic tetragonal crystal phase stabilizer.

39. The composition of claim 38 wherein said particles have an average particle size of from about 8 nm to about 20 nm.

40. The composition of claim 38 wherein said particles have at least about 75% combined cubic and tetragonal crystal lattice structure.

41. The composition of claim 38 wherein said particles have at least about 85% combined cubic and tetragonal crystal lattice structure.

42. The composition of claim 38 wherein said particles comprise polyether carboxylic acid adsorbed on said particles.

43. The composition of claim 38, wherein said monomers comprise said first monomer and said second monomer.

44. The composition of claim 38, further comprising:
c) a component comprising any of:
a third monomer having the formula $CH_2=CHCONR^3R^4$, where $R^3$ is hydrogen or an alkyl group having from 1 to 10 carbon atoms and $R^4$ is an alkyl group, when $R^3$ is hydrogen, $R^4$ is an alkyl group having from 8 to 16 carbon atoms, and when $R^3$ is an alkyl group having from 1 to 10 carbon atoms, $R^4$ is an alkyl group having a sufficient number of carbon atoms such that the sum of the carbon atoms of $R^3$ and $R^4$ is at least 8, the homopolymer of the third monomer having a $T_g$ greater than 15° C.;
i) a monomer having the formula $CH_2CHCONHCR^5R^6COWP$, where $R^5$ and $R^6$ are alkyl groups having from 1 to 14 carbon atoms, cycloalkyl groups having from 3 to 14 carbon atoms, aryl groups having from 5 to 12 carbon atoms, an arene group having from 6 to 16 carbon atoms and no greater than 3 atoms selected from the group consisting of S, N, and non-peroxide O, or where $R^5$ and $R^6$ when taken together with the carbon atoms to which they are connected form a carboxylic ring having 4 to 12 carbon atoms, W is O, S, NH, or a divalent connecting group, and P is $ArR^7$, where Ar is an styrene group and $R^7$ is a linear or branched alkyl or alkoxy group, an aryl group, or an alkarylene group such that the total number of carbon atoms in $ArR^7$, is at least 10, or

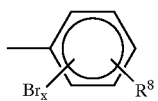

where x is from 1 to 4, and $R^8$ is a linear or branched alkyl group having at least 4 carbon atoms;

ii) a monomer having the formula:

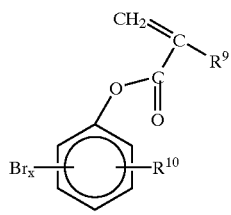

where $R^9$ is H or $CH_3$, x is from 1 to 4, and $R^{10}$ is a linear or branched alkyl group having at least 4 carbon atoms;
iii) a monomer having the formula $CH_2=CHCOO(R^{11})_nOCOCH=CH_2$, where $R^{11}$ is a linear or branched alkylene and n is at least 6;
iv) a polymer having a molecular weight greater than about 1500 and being soluble in at least one of said first monomer and said second monomer;
v) surface-modified particles ; or
vi) combinations thereof.

45. An article comprising:
a polycarbonate substrate; and
the composition of claim 38 on said substrate.

46. An article comprising:
a polycarbonate substrate; and
the composition of claim 1 on said substrate.

47. The article of claim 46, further comprising a second polycarbonate substrate, said composition being disposed between said first polycarbonate substrate and said second polycarbonate substrate.

48. The article of claim 47, further comprising a second polycarbonate substrate, said composition being disposed between said first polycarbonate substrate and said second polycarbonate substrate.

49. The article according to claim 47, wherein said article is in the form of an optical recording medium.

50. The composition of claim 1 further comprising a monomer having the formula $CH_2=CHCONR^3R^4$, where $R^3$ is hydrogen or an alkyl group having from 1 to 10 carbon atoms and $R^4$ is an alkyl group, when $R^3$ is hydrogen, $R^4$ is an alkyl group having from 8 to 16 carbon atoms, and when $R^3$ is an alkyl group having from 1 to 10 carbon atoms, $R^4$ is an alkyl group having a sufficient number of carbon atoms such that the sum of the carbon atoms of $R^3$ and $R^4$ is at least 8, the homopolymer of said monomer having a Tg greater than 15° C.

51. The composition of claim 50, wherein said monomer having the formula $CH_2=CHCONR^3R^4$ comprises N-octyl acrylamide, N-nonyl acrylamide, N-isodecylacrylamide, N-isononyl acrylamide, or combinations thereof.

52. A composition comprising:
a) a first monomer having the formula $CH_2=CHCOOR^1$, where $R^1$ is a linear alkyl group having from 9 to 16 carbon atoms or a branched alkyl group having from 9 to 30 carbon atoms, and whose homopolymer has a $T_g$ less than 0° C.;
b) a second monomer comprising a tricyclic hydrocarbon having the formula $CH_2=CHCOOR^2$, where $R^2$ is an alkyl group having at least 9 carbon atoms whose homopolymer has $T_g$ greater than 15° C.; and
c) a component comprising any of:
i) a monomer having the formula $CH_2CHCONHCR^5R^6COWP$,
where $R^5$ and $R^6$ are alkyl groups having from 1 to 14 carbon atoms, cycloalkyl groups having from 3 to 14 carbon atoms, aryl groups having from 5 to 12 carbon atoms, an arene group having from 6 to 16 carbon atoms and no greater than 3 atoms selected from the group consisting of S, N, and non-peroxide O, or where $R^5$ and $R^6$ when taken together with the carbon atoms to which they are connected form a carboxylic ring having 4 to 12 carbon atoms, W is O, NH, or a divalent connecting group, and P is $ArR^7$, , where Ar is an styrene group and $R^7$ is a linear or branched alkyl or alkoxy group, an aryl group, or an alkarylene group such that the total number of carbon atoms in $ArR^7$ is at least 10, or

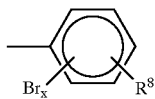

where x is from 1 to 4, and $R^8$ is a linear or branched alkyl group having at least 4 carbon atoms;

ii) a monomer having the formula:

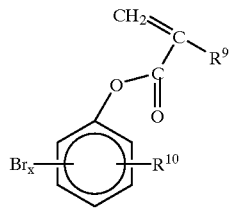

where $R^9$ is H or $CH_3$, x is from 1 to 4, and $R^{10}$ is a linear or branched alkyl group having at least 4 carbon atoms;

iii) a monomer having the formula $CH_2$=CHCOO $(R^{11})_n$OCOCH=$CH_2$, where $R^{11}$ is a linear or branched alkylene and n is at least 6;

iv) a polymer having a molecular weight greater than about 1500 and being soluble in at least one of said first monomer and said second monomer;

v) surface-modified particles ; or vi) combinations thereof.

53. A composition comprising:

a first monomer having the formula $CH_2$=CHCOO$R^1$, where $R^1$ is a linear alkyl group having from 9 to 16 carbon atoms or a branched alkyl group having from 9 to 30 carbon atoms, and whose homopolymer has a $T_g$ less than 0° C.;

b) a second monomer having the formula $CH_2$=CHCOO$R^2$, where $R^2$ is an alkyl group having at least 9 carbon atoms whose homopolymer has $T_g$ greater than 15° C.; and c) a component comprising any of:

i) from about 10 to about 30 parts by weight, base on the total weight of the composition, of a monomer having the formula $CH_2$CHCONHCR$^5$R$^6$COWP, where $R^5$ and $R^6$ are alkyl groups having from 1 to 14 carbon atoms, cycloalkyl groups having from 3 to 14 carbon atoms, aryl groups having from 5 to 12 carbon atoms, an arene group having from 6 to 16 carbon atoms and no greater than 3 atoms selected from the group consisting of S, N, and non-peroxide O, or where $R^5$ and $R^6$ when taken together with the carbon atoms to which they are connected form a carboxylic ring having 4 to 12 carbon atoms, W is O, S, NH, or a divalent connecting group, and P is $ArR^7$ where Ar is an styrene group and $R^7$ is a linear or branched alkyl or alkoxy group, an aryl group, or an alkarylene group such that the total number of carbon atoms in $ArR^7$is at least 10, or

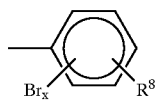

where x, is from 1 to 4, and $R^8$ is a linear or branched alkyl group having at least 4 carbon atoms;

ii) a monomer having the formula:

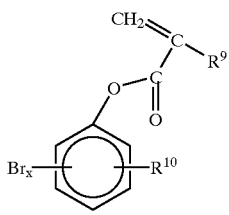

where $R^9$ is H or $CH_3$, x, is from 1 to 4, and $R^{10}$ is a linear or branched alkyl group having at least 4 carbon atoms;

iii) a monomer having the formula $CH_2$=CHCOO $(R^{11})_n$OCOCH=$CH_2$, where $R^{11}$ is a linear or branched alkylene and n is at least 6;

iv) a polymer having a molecular weight greater than about 1500 and being soluble in at least one of said first monomer and said second monomer;

v) surface-modified particles ; or vi) combinations thereof.

54. A compound having the formula $CH_2$=CHCONHC $(CH_3)_2$COOCH$_2$—CH$_2$-R, where R is —OC$_6$H$_5$, —SC$_6$H$_5$, —SCH$_2$CH$_3$, —OC$_6$H$_4$—C(CH$_3$)$_3$, or —OC$_6$H$_4$—C(CH$_3$)$_2$—C$_6$H$_5$.

55. An adhesive composition comprising a compound of claim 54.

* * * * *

UNITED STATES PATENT AND TRADEMARK OFFICE
CERTIFICATE OF CORRECTION

PATENT NO.      : 6,416,838 B1
DATED           : July 9, 2002
INVENTOR(S)     : Arney, David S.

It is certified that error appears in the above-identified patent and that said Letters Patent is hereby corrected as shown below:

Column 1,
Line 6, delete the word "article" and insert in place thereof -- articles --;

Column 3,
Line 20, delete the word "is";

Column 6,
Line 53, insert -- be -- following "can" and preceding "formed";

Column 9,
Line 39, "remove" should read -- removed --;
Line 44, delete the word "from";

Column 10,
Line 19, delete "$K_{\alpha a}$" and insert in place thereof -- $K_{\alpha 1}$ --;

Column 13,
Line 46, "devided" should read -- divided --;
Line 53, "though" should read -- through --;

Column 14,
Line 22, insert -- (1) -- underneath "$ZrO_{(4-n/2)}(X)_n$" on line 21;

Column 15,
Line 41, "$(C_2H_3O_2)$" should read -- $(C_2H_3O_2H)$ --;

Column 17,
Line 6, "reactin" should read -- reaction --;
Line 32, "ratary" should read -- rotary --;

Column 18,
Line 32, "examples," should read -- example, --;

Column 19,
Line 34, delete "Composition" and insert in place thereof -- The composition --;
Line 44, "trimethylopropane" should read -- trimethylolpropane --;

UNITED STATES PATENT AND TRADEMARK OFFICE
CERTIFICATE OF CORRECTION

PATENT NO. : 6,416,838 B1
DATED : July 9, 2002
INVENTOR(S) : Arney, David S.

It is certified that error appears in the above-identified patent and that said Letters Patent is hereby corrected as shown below:

<u>Column 20,</u>
Line 40, "hold" should read -- hole --;

<u>Column 21,</u>
Line 60, delete "pumpis" and insert in place thereof -- pump is --;
Line 62, "chuch" should read -- chuck --;

<u>Column 23,</u>
Line 30, "then" should read -- thin --;
Line 53, insert -- $CH_2$ -- following "$COOCH_2$" and preceeding "O";

<u>Column 24,</u>
Line 2, "$COOOCH_2$" should read -- $COOCH_2$ --;
Lines 58 and 66, insert -- the procedure -- following "to" and preceding "set";

<u>Column 27,</u>
Line 16, delete "29" and insert in place thereof -- 39 --;
Line 59, "a" should read -- A -- in $2^{nd}$ instance;
Lines 65-66, "clevage" should read -- cleavage --;

<u>Column 28,</u>
Line 25, delete "1,2-" and insert in place thereof -- 1, 12 --;
Line 59, "95" should read -- 95g --;

<u>Column 29,</u>
Line 16, insert -- of -- following "1," and preceding "U.S. Pat. No.";
Line 17, "5,506.279" should read -- 5,506,279 --;
Line 27, "(LA/IBA/NOA" should read -- (IOA/IBA/NOA --;
Line 28, "5" should read -- 5g --;

<u>Column 30,</u>
Line 24, "65" should read -- 165 --;

<u>Column 31,</u>
Line 62, "16,13" should read -- 16.13 --;
Line 67, "(31.5/42.8125.6)" should read -- (31.5/42.8/25.6) --;

UNITED STATES PATENT AND TRADEMARK OFFICE
CERTIFICATE OF CORRECTION

PATENT NO. : 6,416,838 B1
DATED : July 9, 2002
INVENTOR(S) : Arney, David S.

It is certified that error appears in the above-identified patent and that said Letters Patent is hereby corrected as shown below:

Column 33,
Lines 13 and 15, "stiffed" should read -- stirred --;
Line 20, "stiffed" should read -- stirred --;

Column 34,
Line 28, delete "Rand" and insert in place thereof -- $R^5$ and --;
Line 41, insert -- , -- following "group" and preceding "such";

Column 35,
Line 35, "(pH)" should read -- (Ph) --;
Line 37, "$COOCH_2CH_2$" should read -- COOCH2CH2 --;
Line 39, delete "$-CO_8H_{17}$" and insert in place thereof -- $OC_8H_{17}$ --;
Line 49, delete "claim 10" and insert in place thereof -- claim 1 --;

Column 36,
Line 64, "CH2=" should read -- $CH_2=$ --;

Column 37,
Line 47, delete "the" and insert in place thereof -- a --;
Line 53, "styrene" should read -- arylene --;

Column 38,
Line 60, "$CHCOOR^2$" should read -- $CHCOOR_2$ --;

Column 39,
Line 6, insert -- s, -- following "O" preceding "NH,";
Line 8, delete "styrene" and insert in place thereof -- arylene --;
Line 30, "$CH_3$" should read -- $CH^3$ --;
Lines 32 and 33, "$CH_2$" should read -- $CH^2$ --;
Line 48, insert -- a -- following "has" and preceding "Tg";
Line 51, "base" should read -- based --;

UNITED STATES PATENT AND TRADEMARK OFFICE
CERTIFICATE OF CORRECTION

PATENT NO. : 6,416,838 B1
DATED : July 9, 2002
INVENTOR(S) : Arney, David S.

It is certified that error appears in the above-identified patent and that said Letters Patent is hereby corrected as shown below:

Column 40,
Line 36, "$CH_3$" should read -- $CH^3$ --;
Line 48, "$COOCH_2–CH_2\text{-}R$" should read -- $COOCH_2CH_2\text{-}R$ --.

Signed and Sealed this

Fourth Day of February, 2003

JAMES E. ROGAN
*Director of the United States Patent and Trademark Office*